(12) United States Patent
Nishiyama

(10) Patent No.: US 8,575,810 B2
(45) Date of Patent: Nov. 5, 2013

(54) MOTOR

(75) Inventor: Noriyoshi Nishiyama, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/642,901

(22) PCT Filed: Feb. 22, 2012

(86) PCT No.: PCT/JP2012/001198
§ 371 (c)(1),
(2), (4) Date: Oct. 23, 2012

(87) PCT Pub. No.: WO2013/018245
PCT Pub. Date: Feb. 7, 2013

(65) Prior Publication Data
US 2013/0113318 A1    May 9, 2013

(30) Foreign Application Priority Data
Jul. 29, 2011    (JP) .................................. 2011-166496

(51) Int. Cl.
*H02K 21/04*    (2006.01)
(52) U.S. Cl.
USPC .......................................... 310/181; 310/114
(58) Field of Classification Search
USPC ................... 310/181, 112–114, 266
See application file for complete search history.

(56) References Cited

U.S. PATENT DOCUMENTS

| | | | |
|---|---|---|---|
| 6,492,756 B1 * | 12/2002 | Maslov et al. | 310/156.12 |
| 6,727,632 B2 * | 4/2004 | Kusase | 310/266 |
| 7,030,528 B2 * | 4/2006 | Morgante | 310/112 |
| 7,977,841 B2 * | 7/2011 | Yang | 310/181 |
| 8,288,916 B2 * | 10/2012 | Quere | 310/266 |
| 2008/0185932 A1 | 8/2008 | Jajtic et al. | |
| 2013/0106338 A1 * | 5/2013 | Kim et al. | 318/701 |

FOREIGN PATENT DOCUMENTS

| | | |
|---|---|---|
| JP | 6-105593 | 4/1994 |
| JP | 8-256455 | 10/1996 |
| JP | 2001-37189 | 2/2001 |
| JP | 2002-199679 | 7/2002 |
| JP | 2004-229404 | 8/2004 |
| JP | 2005-312127 | 11/2005 |
| JP | 2011-83066 | 4/2011 |
| WO | 2007/033857 | 3/2007 |

OTHER PUBLICATIONS

International Search Report issued May 22, 2012 in corresponding International Application No. PCT/JP2012/001198.

* cited by examiner

*Primary Examiner* — Dang Le
(74) *Attorney, Agent, or Firm* — Wenderoth, Lind & Ponack, L.L.P.

(57) ABSTRACT

To provide a motor including: an annular stator including permanent magnets and stator cores that are alternately arranged circumferentially, and coils; an annular outer-rotor being arranged outside the stator, having a rotational axis coincident with a central axis of the stator, and having first salient poles; and an annular inner-rotor being arranged inside the stator, having a rotational axis coincident with the central axis to rotate in conjunction with the outer-rotor, and having second salient poles equal in number to the first salient poles, the magnets are magnetized circumferentially and extend radially, and each have respective ends that are opened toward the outer-rotor and toward inner-rotor in the radial direction, the coils are each wound by concentrated-winding on a tooth constituted from a different one magnet and respective parts of two stator cores adjacent to the magnet, and the first and second salient poles are arranged at offset positions circumferentially.

22 Claims, 20 Drawing Sheets

MOTOR

TECHNICAL FIELD

The present invention relates to a motor with use of permanent magnets.

BACKGROUND ART

There is a particular desire for motors for use in compressors, electric cars, hybrid cars, fuel cell-powered cars, and the like to produce high torque, among the demands for motors to be small, light-weight, high-output, low-vibration, low-noise, and high-efficient.

In response to the above demand, there has conventionally been proposed a motor 101 as shown in FIG. 18 (see Patent Literature 1). The motor 101 includes an annular stator 102 that includes stator cores 103, permanent magnets 104, and coils 105, and a rotor 108 having a plurality of salient poles 109 (five salient poles in FIG. 18). The stator cores 103 have a plurality of teeth 110 (six teeth in FIG. 18) and an annular stator yoke 107 surrounding the outer side of each of the teeth 110. The motor 101 improves torque with use of magnetic fluxes generated by the permanent magnets 104.

However, this structure of the motor 101 has a problem. In the center of each of the teeth 110 in the circumferential direction thereof, a permanent magnet 104 is arranged that is magnetized in the circumferential direction of the stator 102. This results in that magnetic circuits arising from the N pole and returning to the S pole is shorted by the stator yoke 107 that is made of a material having a magnetic permeability higher than the magnetic permeability of air. Accordingly, most of magnetic fluxes generated by the N pole of the permanent magnet 104 return to the S pole of the permanent magnet 104 through the stator yoke 107 made of a material having a high magnetic permeability. This reduces magnetic fluxes to be flowed to the rotor 108, and as a result cannot sufficiently improve torque to be produced by the rotor 108.

In consideration of this problem, there has conventionally been proposed a motor having the structure where a magnetic circuit that arises from the N pole of each permanent magnet and returns to the S pole of the permanent magnet is broken on the way.

CITATION LIST

Patent Literature

[Patent Literature 1] Japanese Patent Application Publication No. 2002-199679

SUMMARY OF INVENTION

Technical Problem

According to the above conventional motor having the structure where a magnetic circuit, which arises from the N pole of each permanent magnet and returns to the S pole of the permanent magnet, is broken on the way, however, in the case where magnets made of a material having a low energy product are adopted as the permanent magnets, flow of a large amount of current for high torque production tends to cause demagnetization of the permanent magnets.

The present invention was made in view of the above problem, and aims to provide a motor capable of improving demagnetization resistance and achieving high torque.

Solution to Problem

The motor disclosed in the present Description is a motor comprising: a motor comprising: an annular stator that includes a plurality of permanent magnets, a plurality of stator cores, and a plurality of coils, the permanent magnets and the stator cores being alternately arranged in a circumferential direction of the stator, an annular outer-rotor that is arranged outside the stator, has a rotational axis coincident with a central axis of the stator, and has a plurality of first salient poles; and an annular inner-rotor that is arranged inside the stator, has a rotational axis coincident with the central axis of the stator so as to rotate in conjunction with the outer-rotor, and has a plurality of second salient poles that are equal in number to the first salient poles, wherein the permanent magnets are magnetized in the circumferential direction and extend in a radial direction of the stator, and each of the permanent magnets has one end that is opened toward the outer-rotor in the radial direction and the other end that is opened toward inner-rotor in the radial direction, the coils are each wound by concentrated-winding on a tooth that is constituted from a different one of the permanent magnets and respective parts of two stator cores adjacent to the permanent magnet, and the first salient poles are arranged at offset positions relative to the second salient poles in the circumferential direction.

Advantageous Effects of Invention

With the above structure, the second salient poles are provided so as to be equal in number to the first salient poles, and the first salient poles are arranged at offset positions relative to the second salient poles in the circumferential direction of the stator. This increases the probability that either of the first salient pole and the second salient pole is arranged within the magnetic circuit of the permanent magnet corresponding in position, and also increases the permeance coefficient of the permanent magnet, thereby improving the demagnetization resistance of the permanent magnets against energization to the coils. Also, with the above structure, the time period while one of the outer-rotor and the inner-rotor produces torque includes the time period while none of the first salient poles and the second salient poles is positioned within the magnetic circuits of the permanent magnets. This makes most of magnetic fluxes generated by the permanent magnets to contribute to torque production, thereby achieving high torque.

DESCRIPTION OF EMBODIMENTS

Figure 19:
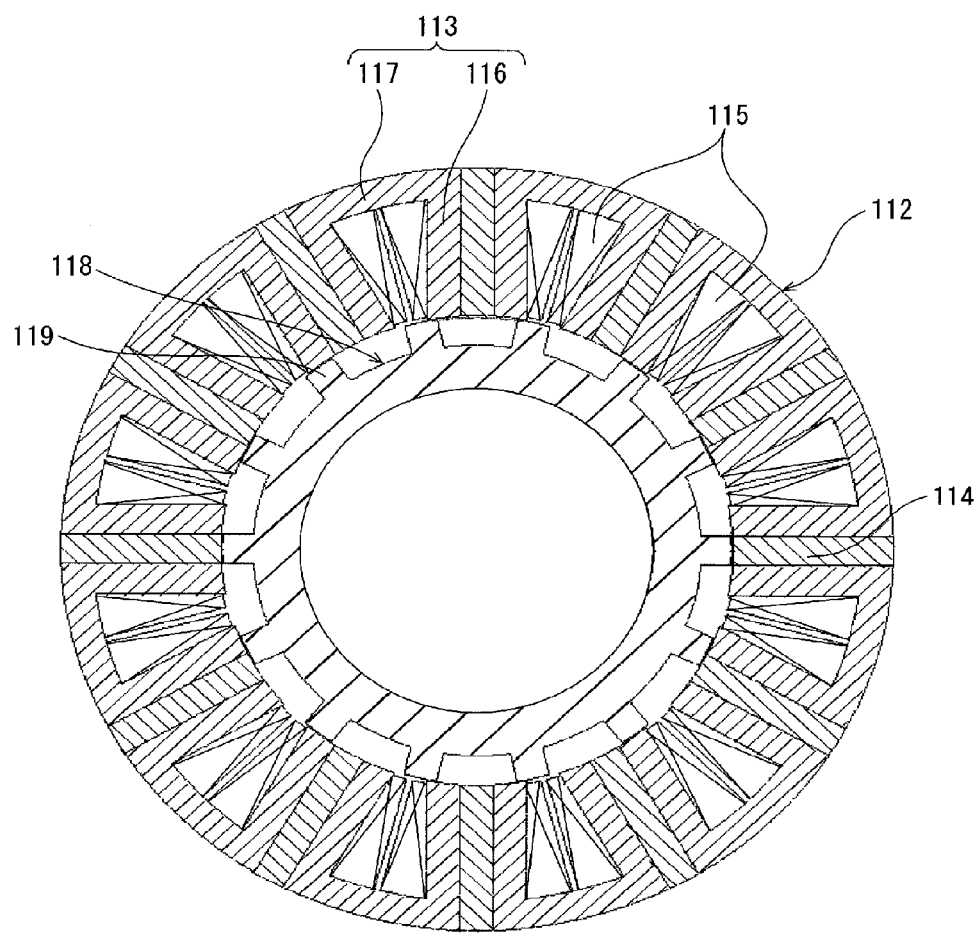
FIG. 19 is a schematic cross-sectional view showing a motor including an inner-rotor that is analogized from Patent Literature 1.

An example of a motor having the structure where a magnetic circuit, which arises from the N pole of each permanent magnet and returns to the S pole of the permanent magnet, is broken on the way, as shown in FIG. 19, an inner-rotor type motor 111 that includes a stator 112, an inner-rotor 118 inside the stator, and permanent magnets 114. The permanent magnets 114 each have respective ends on the side facing the rotor 118 and the side that is opposite to the side facing the rotor 118 that are open without being covered by the stator core 113.

According to this structure, the rotor 118 is made of a soft magnetic material and has 14 salient poles 119, and the stator 112 includes stator cores 113, permanent magnets 114, and coils 115. Here, the stator cores 113 each have two extending parts 116 that each extend from the inner-rotor 118 in the radial direction of the stator 112 and a connecting part 117 that connects the two extending parts 116 with each other on the side of the outer circumferential surface of the stator 112 against a position where the coil 115 is wound on the stator core 113.

Figure 18:
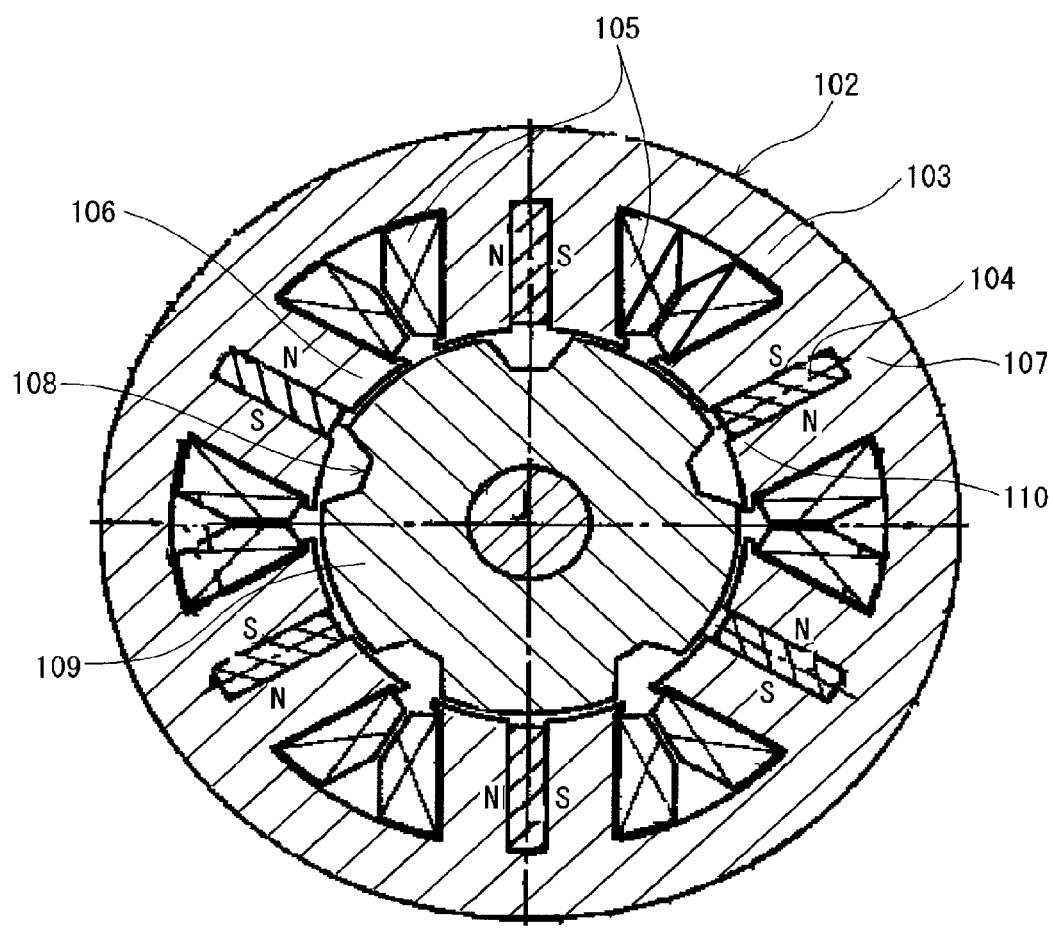
FIG. 18 is a schematic cross-sectional view showing a motor relating to a conventional example.

Different from the motor 101 shown in FIG. 18, the motor 111 increases the magnetic fluxes flowing from the permanent magnets 114 to the rotor 118 because the stator cores 113 do not short the magnetic circuits of the permanent magnets 114. Accordingly, compared with the motor 101 shown in FIG. 18, the motor 111 achieves high torque production by the rotor 118.

Figure 20:
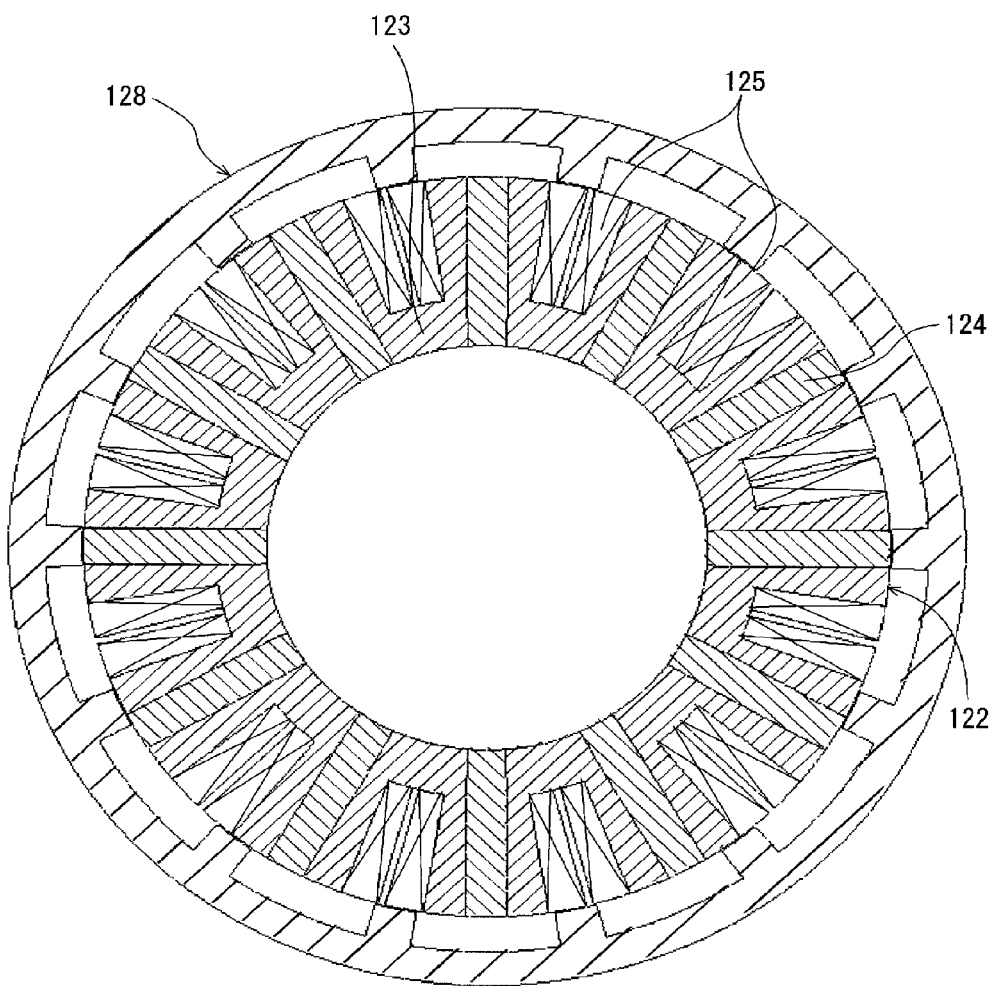
FIG. 20 is a schematic cross-sectional view showing a motor including an outer-rotor that is analogized from Patent Literature 1.

Another example of a motor having the structure where a magnetic circuit, which arises from the N pole of each permanent magnet and returns to the S pole of the permanent magnet, is broken on the way, as shown in FIG. 20, an outer-rotor type motor 121 that includes a stator 122, an outer-rotor 128 outside the stator 122, and permanent magnets 124. The permanent magnets 124 each have respective ends on the side facing the rotor 128 and the side that is opposite to the side facing the rotor 128 that are open without being covered by the stator core 123. Accordingly, compared with the motor 101 shown in FIG. 18, the motor 128 achieves high torque production by the rotor 128 like the motor 111 shown in FIG. 19.

According to the respective motors having the structures shown in FIG. 19 and FIG. 20, however, in the case where magnets made of a material having a low energy product are used as permanent magnets, flow of a large amount of current for high torque production tends to cause demagnetization of the permanent magnets.

Figure 21A:
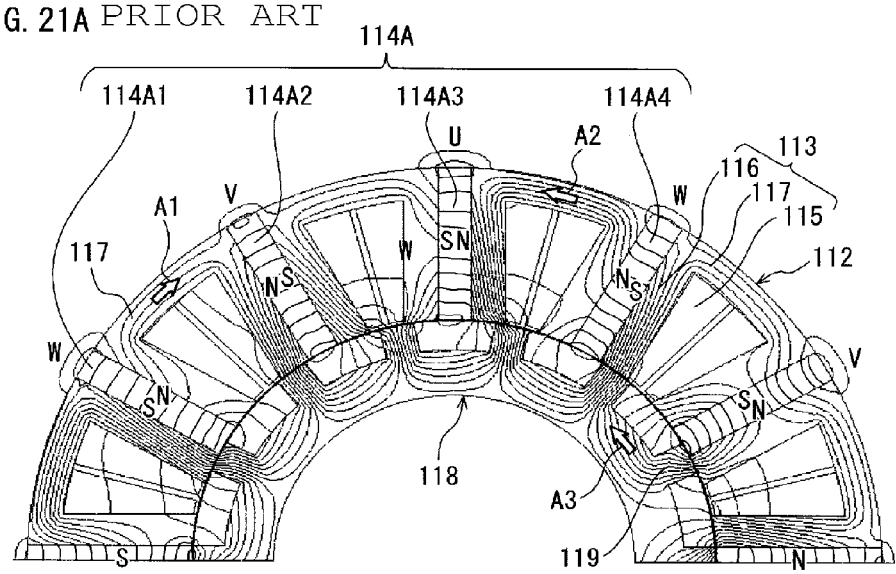
FIG. 21A and FIG. 21B each show magnetic flux lines inside the motor relating to the conventional example shown in FIG. 19.
Figure 21B:
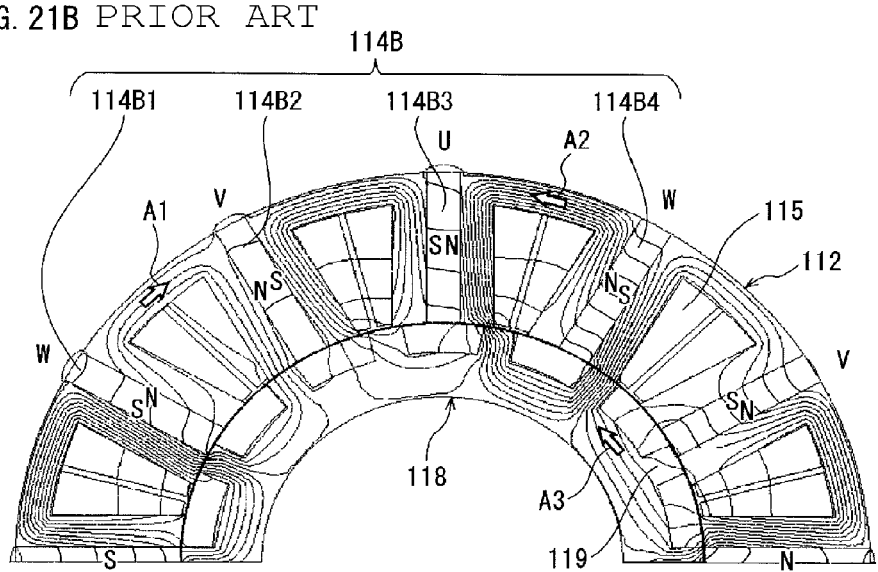

The following describes this problem with use of results of magnetic field analysis shown in FIG. 21A and FIG. 21B. FIG. 21A shows magnetic fluxes inside the motor 111 shown in FIG. 19 in the case where torque is produced by energization to the coils 115 with use of, as the permanent magnets 114, rare earth magnets 114A each having an energy product of 350 kJ/m$^3$. FIG. 21B shows magnetic fluxes inside the motor 111 in the case where torque is produced by energization to the coils 115 with use of, as the permanent magnets 114, rare earth magnets 114B each having an energy product of 42 kJ/m$^3$.

As shown in FIG. 21A and FIG. 21B, to permanent magnets 114A2 and 114B2 and permanent magnets 114A3 and 114B3, the magnetic fields are applied that are reverse in direction to magnetic fields produced by the permanent magnets 114A2 and 114B2 and the permanent magnets 114A3 and 114B3 (hereinafter, "reverse magnetic field"), respectively. Compared with this, to permanent magnets 114A4 and 114B4, magnetic fields are applied that are identical in direction to magnetic fields produced by the permanent magnets 114A4 and 114B4, respectively.

The following compares the permanent magnets 114A2 and 114B2 and the permanent magnets 114A3 and 114B3 with the permanent magnets 114A4 and 114B4. According to the motor 111 adopting the rare earth magnets 114A shown in FIG. 21A, the comparison results shows no great variation in magnetic flux density of the permanent magnets to which the reverse magnetic fields have been applied. Compared with this, according to the motor 111 adopting the ferrite magnets 114B shown in FIG. 21B, the comparison results show the decrease in magnetic flux density of the permanent magnets to which the reverse magnetic fields have been applied. In other words, according to the motor having the structure shown in FIG. 19, although adoption of rare earth magnets does not cause a great variation in magnetic flux thereof, adoption of ferrite magnets causes demagnetization due to the reverse magnetic field acting on the ferrite magnets. Therefore, in the case where ferrite magnets, which have an energy product lower than an energy product of rare earth magnets, are adopted as the permanent magnets of the motor having the structure shown in FIG. 19, it is difficult to produce high torque.

The motor disclosed in the present Description is a motor comprising: a motor comprising: an annular stator that includes a plurality of permanent magnets, a plurality of stator cores, and a plurality of coils, the permanent magnets and the stator cores being alternately arranged in a circumferential direction of the stator, an annular outer-rotor that is arranged outside the stator, has a rotational axis coincident with a central axis of the stator, and has a plurality of first salient poles; and an annular inner-rotor that is arranged inside the stator, has a rotational axis coincident with the central axis of the stator so as to rotate in conjunction with the outer-rotor, and has a plurality of second salient poles that are equal in number to the first salient poles, wherein the permanent magnets are magnetized in the circumferential direction and extend in a radial direction of the stator, and each of the permanent magnets has one end that is opened toward the outer-rotor in the radial direction and the other end that is opened toward inner-rotor in the radial direction, the coils are each wound by concentrated-winding on a tooth that is constituted from a different one of the permanent magnets and respective parts of two stator cores adjacent to the permanent magnet, and the first salient poles are arranged at offset positions relative to the second salient poles in the circumferential direction.

With the above structure, the second salient poles are provided so as to be equal in number to the first salient poles, and the first salient poles are arranged at offset positions relative to the second salient poles in the circumferential direction of the stator. This increases the probability that either of the first salient pole and the second salient pole is arranged within the magnetic circuit of the permanent magnet corresponding in position, and also increases the permeance coefficient of the permanent magnet, thereby improving the demagnetization resistance of the permanent magnets against energization to the coils. Also, with the above structure, the time period while one of the outer-rotor and the inner-rotor produces torque includes the time period while none of the first salient poles and the second salient poles is positioned within the magnetic circuits of the permanent magnets. This makes most of magnetic fluxes generated by the permanent magnets to contribute to torque production, thereby achieving high torque.

Also, according to the motor disclosed in the present Description, the stator cores each may have two extending parts and a connecting part, the two extending parts each extending from the inner-rotor toward the outer-rotor in the radial direction and each being the part on which the coil is wound, the connecting part connecting the two extending parts with each other on sides thereof facing the inner-rotor in the radial direction, in a cross section of the motor perpendicular to a direction of the central axis, the extending parts and the permanent magnets each may have a first circumferential surface on a side facing the outer-rotor and a second circumferential surface on the side facing the inner-rotor in the radial direction, and the first salient poles and the second salient poles may be arranged such that, in the cross section, when an edge forward in a first circumferential direction of a circumferential surface of at least one second salient pole is coincident with an edge forward in a second circumferential direction of a second circumferential surface of an extending part that is adjacent, forward in the first circumferential direction, to a permanent magnet corresponding in position with the second salient pole, at least one first salient pole corresponds in position in the radial direction with a certain portion of the extending part that is adjacent, forward in the first circumferential direction, to the permanent magnet, where the first circumferential direction and the second circumferential direction are circumferential directions of the stator opposite to each other.

The above structure achieves torque production by mainly the outer-rotor, improvement in demagnetization resistance, high torque, and high efficiency.

Also, according to the motor disclosed in the present Description, the stator cores each may have two extending parts and a connecting part, the two extending parts each extending from the inner-rotor toward the outer-rotor in the radial direction and each being the part on which the coil is wound, the connecting part connecting the two extending parts with each other on sides thereof facing the inner-rotor in the radial direction, in a cross section of the motor perpendicular to a direction of the central axis, the extending parts and the permanent magnets each may have a first circumferential surface on a side facing the outer-rotor and a second circumferential surface on the side facing the inner-rotor in the radial direction, and the first salient poles and the second salient poles may be arranged such that, in the cross section, when an edge forward in the second circumferential direction of the circumferential surface of the at least one second salient pole is coincident with an edge forward in the first circumferential direction of a second circumferential surface of an extending part that is adjacent, forward in the second circumferential direction, to the permanent magnet corresponding in position with the second salient pole, the at least one first salient pole does not correspond in position in the radial direction with the extending part that is adjacent, forward in the second circumferential direction, to the permanent magnet.

The above structure achieves torque production by mainly the outer-rotor, improvement in demagnetization resistance, high torque, and high efficiency.

Also, according to the motor disclosed in the present Description, the inner-rotor may have the second salient poles each made of a magnetic material and other part made of a non-magnetic material.

With the above structure, torque is produced by mainly the outer-rotor, and an amount of magnetic fluxes leaking to the inner-rotor is reduced. This achieves high torque and high efficiency.

Also, according to the motor disclosed in the present Description, the first circumferential surface of each of the permanent magnets may be recessed in the radial direction against at least respective first circumferential surfaces of two extending parts adjacent to the permanent magnet.

Also, according to the motor disclosed in the present Description, the second circumferential surface of each of the permanent magnets may be smaller in width in the circumferential direction than the circumferential surface of each of the second salient poles.

The above structure enables short of a magnetic circuit that arises from each permanent magnet, flows to an adjacent extending part and a second salient pole, and returns to the permanent magnet. This increases the permeance coefficient of the permanent magnet, thereby further improving the demagnetization resistance.

Also, according to the motor disclosed in the present Description, the stator cores each may have two extending parts and a connecting part, the two extending parts each extending from the inner-rotor toward the outer-rotor in the radial direction and each being the part on which the coil is wound, the connecting part connecting the two extending parts with each other on sides thereof facing the outer-rotor in the radial direction, in a cross section of the motor perpendicular to a direction of the central axis, the extending parts and the permanent magnets each may have a first circumferential surface on a side facing the outer-rotor and a second circumferential surface on the side facing the inner-rotor in the radial direction, and the first salient poles and the second salient poles may be arranged such that, in the cross section, when an edge forward in a first circumferential direction of a circumferential surface of at least one first salient pole is coincident with an edge forward in a second circumferential direction of a first circumferential surface of an extending part that is adjacent, forward in the first circumferential direction, to a permanent magnet corresponding in position with the first salient pole, at least one second salient pole corresponds in position in the radial direction with a certain portion of the extending part that is adjacent, forward in the first circumferential direction, to the permanent magnet, where the first circumferential direction and the second circumferential direction are circumferential directions of the stator opposite to each other.

The above structure achieves torque production by mainly the inner-rotor, improvement in demagnetization resistance, high torque, and high efficiency.

Also, according to the motor disclosed in the present Description, the stator cores each may have two extending parts and a connecting part, the two extending parts each extending from the inner-rotor toward the outer-rotor in the radial direction and each being the part on which the coil is wound, the connecting part connecting the two extending parts with each other on sides thereof facing the outer-rotor in the radial direction, in a cross section of the motor perpendicular to a direction of the central axis, the extending parts and the permanent magnets each may have a first circumferential surface on a side facing the outer-rotor and a second circumferential surface on the side facing the inner-rotor in the radial direction, and the first salient poles and the second salient poles may be arranged such that, in the cross section, when an edge forward in the second circumferential direction of the circumferential surface of the at least one first salient pole is coincident with an edge forward in the first circumferential direction of a first circumferential surface of an extending part that is adjacent, forward in the second circumferential direction, to the permanent magnet corresponding in position with the first salient pole, the at least one second salient pole does not correspond in position in the radial direction with the extending part that is adjacent, forward in the second circumferential direction, to the permanent magnet.

The above structure achieves torque production by mainly the inner-rotor, improvement in demagnetization resistance, high torque, and high efficiency.

Also, according to the motor disclosed in the present Description, the outer-rotor may have the first salient poles each made of a magnetic material and other part made of a non-magnetic material.

With the above structure, torque is produced by mainly the outer-rotor, and an amount of magnetic fluxes leaking to the inner-rotor is reduced. This achieves high torque and high efficiency.

Also, according to the motor disclosed in the present Description, the second circumferential surface of each of the permanent magnets may be recessed in the radial direction against at least respective second circumferential surfaces of two extending parts adjacent to the permanent magnet.

Also, according to the motor disclosed in the present Description, the first circumferential surface of each of the permanent magnets may be smaller in width in the circumferential direction than the circumferential surface of each of the first salient poles.

The above structure enables short of a magnetic circuit that arises from each permanent magnet, flows to an adjacent extending part and a first salient pole, and returns to the permanent magnet. This increases the permeance coefficient of the permanent magnet, thereby further improving the demagnetization resistance.

Also, according to the motor disclosed in the present Description, the first salient poles and the second salient poles may be arranged such that, in the cross section, a center of each of the second salient poles is positioned on an axis of symmetry of two line segments connecting the central axis with respective centers of any two adjacent of the first salient poles.

With the above structure, the outer-rotor and the inner-rotor are arranged so as to mutually cancel torque ripple generated therein. This reduces vibration.

Also, according to the motor disclosed in the present Description, the coils all may be wound in a same direction, and each two adjacent of the permanent magnets may have respective magnetization directions that are opposite to each other.

Also, according to the motor disclosed in the present Description, the permanent magnets each may have an energy product of 150 kJ/m$^3$ or less.

Also, according to the motor disclosed in the present Description, the permanent magnets each may be a ferrite magnet.

Also, according to the motor disclosed in the present Description, the number of the first salient poles and the number of the second salient poles each may be 14n, the number of the teeth and the number of the coils each may be 12n, where n is an integer equal to or greater than one.

With the above structure, the motor, which includes the outer-rotor having 14n salient poles and the inner-rotor having 14n salient poles, also prevents the decrease in effective magnetic flux. This achieves high torque and high efficiency.

Furthermore, appropriate modification of the value n allows application to various types of motors.

Also, according to the motor disclosed in the present Description, the number of the first salient poles and the number of the second salient poles each may be 10n, the number of the teeth and the number of the coils each may be 12n, where n is an integer equal to or greater than one.

With the above structure, the motor, which includes the outer-rotor having 10n salient poles and the inner-rotor having 10n salient poles, also prevents decrease in effective magnetic flux. This achieves high torque and high efficiency.

Embodiment 1

<1> Structure

Figure 1:
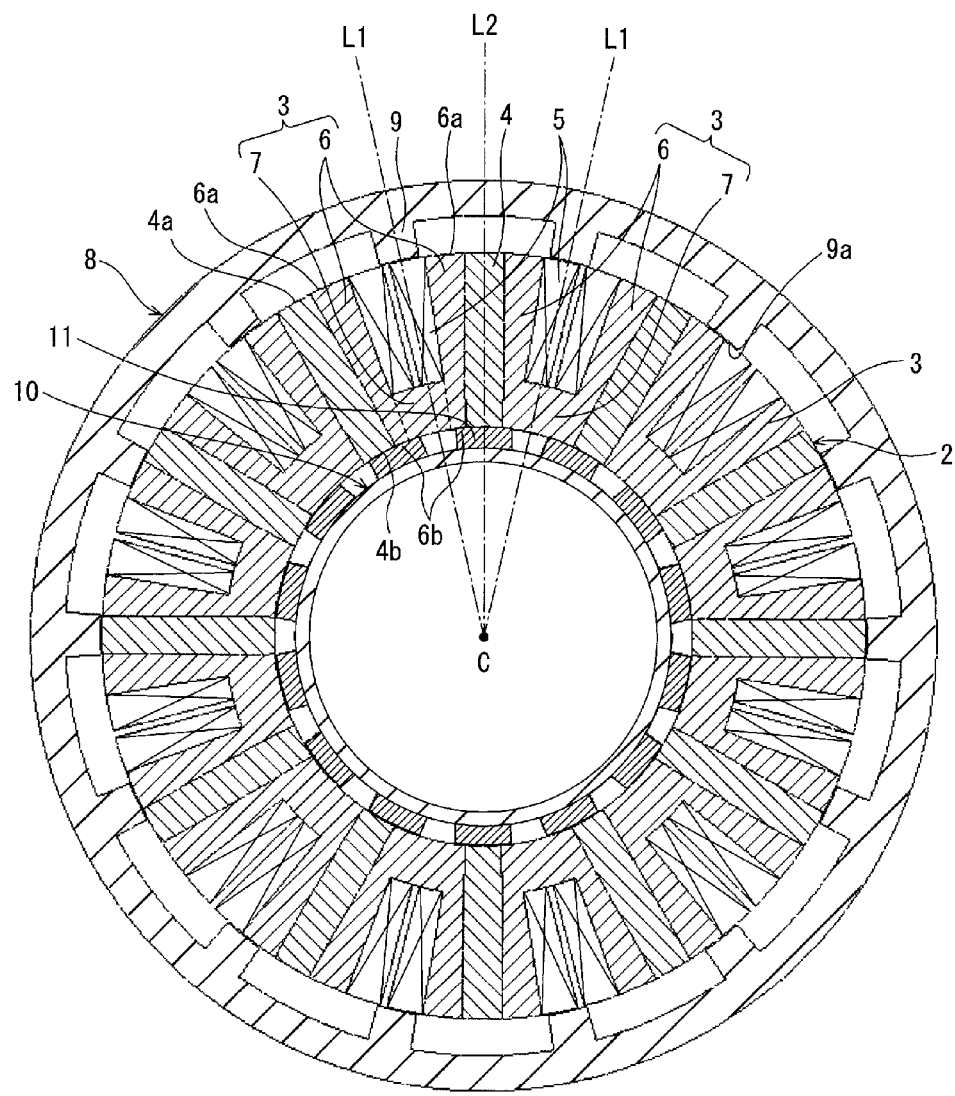
FIG. 1 is a schematic cross-sectional view showing a motor relating to Embodiment 1.

FIG. 1 shows the structure of a motor relating to the present embodiment.

The motor 1 includes an annular stator 2, an annular outer-rotor 8, and an annular inner-rotor 10. The outer-rotor 8 is arranged outside the stator 2, and has the rotational axis coincident with the central axis of the stator 2. The inner-rotor 10 is arranged inside the stator 2, and has the rotational axis coincident with the central axis of the stator 2 so as to be coupled to the outer-rotor 8 via a shaft to rotate in conjunction with the outer-rotor 8. The stator 2 includes 12 permanent magnets 4 arranged at regular spaced intervals in a circumferential direction thereof, a plurality of stator cores 3 (12 stator cores in the example shown in FIG. 1) that are each arranged between two adjacent permanent magnets 4, and 12 coils 5.

The outer-rotor 8 and the inner-rotor 10 are each made of a soft magnetic material. Also, the outer-rotor 8 has 14 first salient poles 9 each projecting inward, and the inner-rotor 10 has 14 second salient poles 11 each projecting outward. Note that the inner-rotor 10 may have the second salient poles 11 and other part that differ in material from each other. Specifically, the second salient poles 11 each may be made of a magnetic material, and the other part may be made of a non-magnetic material, such as resin, aluminum alloy, and so on.

Also, the second salient poles 11 have a longer circumferential length than the circumferential length of the permanent magnets 4 in the circumferential direction facing the side of the inner-rotor 10. Also, the first salient poles 9 of the outer-rotor 8 and the second salient poles 11 of the inner-rotor 10 are arranged such that, in the cross section perpendicular to the axial direction, the center of each of the second salient poles 11 is positioned on the axis of symmetry L2 of two line segments L1 connecting the axis C with the respective centers of any two adjacent of the first salient poles 9.

The stator cores 3 are each have two extending parts 6 that each extend in the radial direction of the stator 2 and a connecting part 7 that connects the two extending parts 6 with each other, and has substantially a U-shaped cross section perpendicular to the direction of the axis C. Here, in the cross section perpendicular to the direction of the axis C, the extending parts 6 each have a circumferential surface 6a at one end thereof and a circumferential surface 6b at the other end thereof in the radial direction of the stator 2. The circumferential surface 6a is substantially parallel to the end surface (circumferential surface) of the first salient pole 9 adjacent to the extending part 6, and the circumferential surface 6b is substantially parallel to the end surface of the second salient pole 11 adjacent to the extending part 6. The stator cores 3 are each arranged such that the connecting part 7 faces the side of the inner-rotor 10 against the coil 5. This results in that torque production is contributed to by mainly the outer-rotor 8.

Also, in the cross section perpendicular to the direction of the axis C, the permanent magnets 4 each have a circumferential surface 4a at one end thereof and a circumferential surface 4b at the other end thereof in the radial direction of the stator 2. The circumferential surface 4b is substantially parallel to the end surface (circumferential surface) of the second salient pole 11 adjacent to the permanent magnet 4. Furthermore, as described above, since the circumferential surface 6b of each of the extending parts 6 is substantially parallel to the end surface of the second salient pole 11 adjacent to the extending part 6. This reduces the size of a space generated between the circumferential surface 6b of the extending part 6 and the end surface of the second salient pole 11 and the size of a space generated between the circumferential surface 4b of the permanent magnet 4 and the end surface of the second salient pole 11. Also, the permanent magnets 4 are magnetized in substantially the circumferential direction of the stator 2, such that each two adjacent permanent magnets 4 in the circumferential direction of the stator 2 have the identical poles facing each other in the circumferential direction of the stator 2.

The coils 5 are each wound by concentrated-winding on a group of a permanent magnet 4 and respective extending parts 6 of two stator cores 2 adjacent to the permanent magnet 4. The coils 5 are all wound in the same direction, and arranged in order of the U-phase, the V-phase, and the W-phase in the circumferential direction of the stator 2. Here, the group of the permanent magnet 4 and the respective extending parts 6 of the two stator cores 2 adjacent to the permanent magnet 4 corresponds to "tooth" in the present invention.

Figure 2:
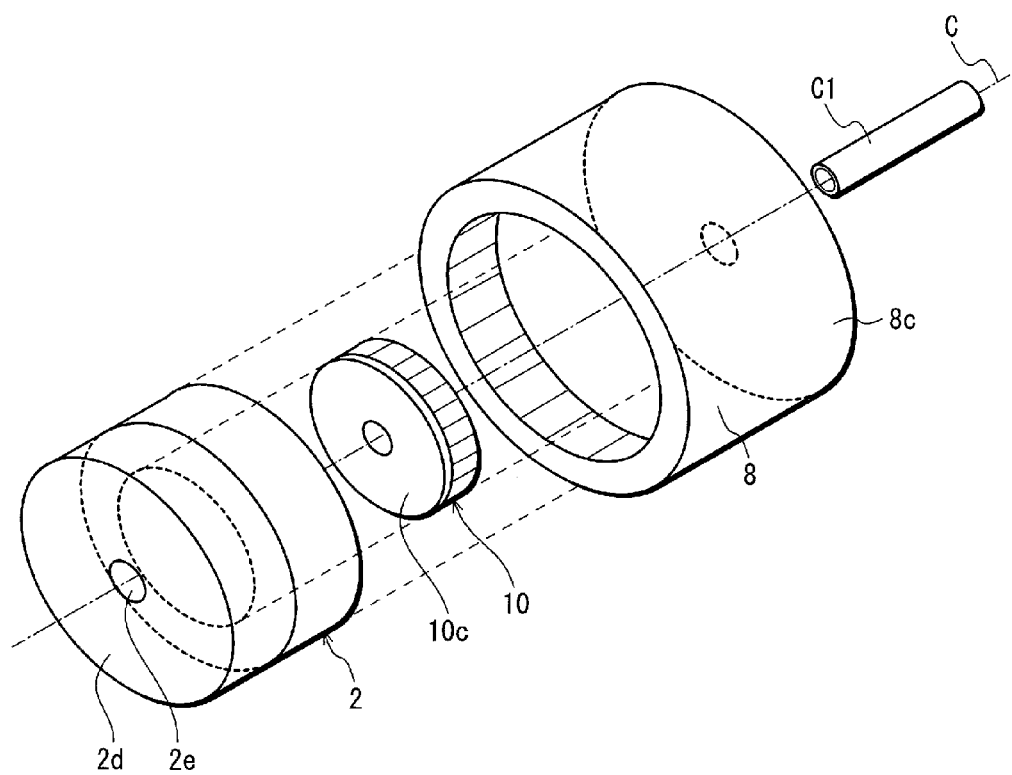
FIG. 2 is a schematic exploded perspective view showing the motor relating to Embodiment 1.

FIG. 2 is a schematic exploded perspective view showing the motor 1. The motor has the structure in which an inner-rotor-supporter 10c provided in the inner-rotor 10 and an outer-rotor-supporter 8c provided in the inner-rotor 10 that are coupled to a shaft C1. The shaft C1 penetrates through a stator-supporter 2d for provided in the stator 2, and is inserted into a shaft bearing hole 2e. In other words, in the state where the inner-rotor 10 and the outer-rotor 8 are coupled to the shaft C1, the stator 2 is fit into a space generated between the inner-rotor 10 and the outer-rotor 8.

Figure 3A:
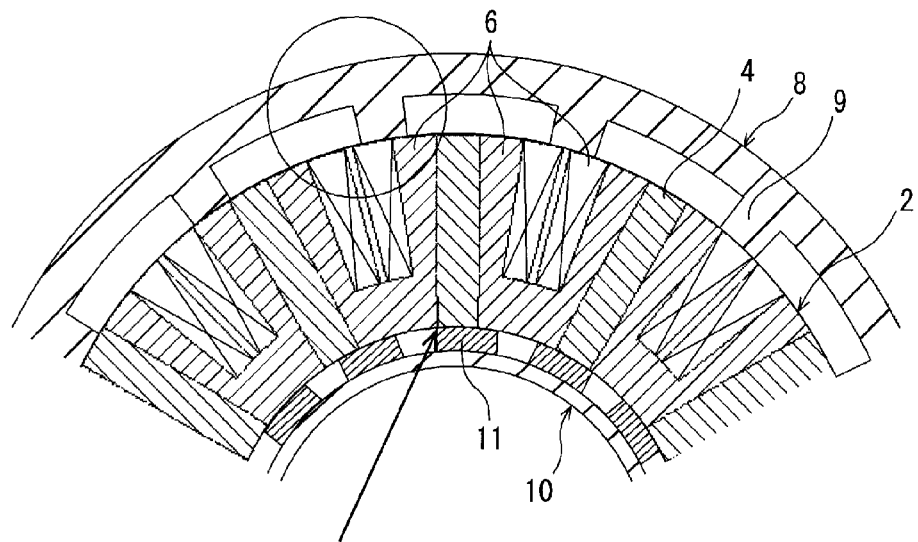
FIG. 3A and FIG. 3B are each a schematic cross-sectional view showing the motor relating to Embodiment 1 for describing operations of the motor.
Figure 3B:
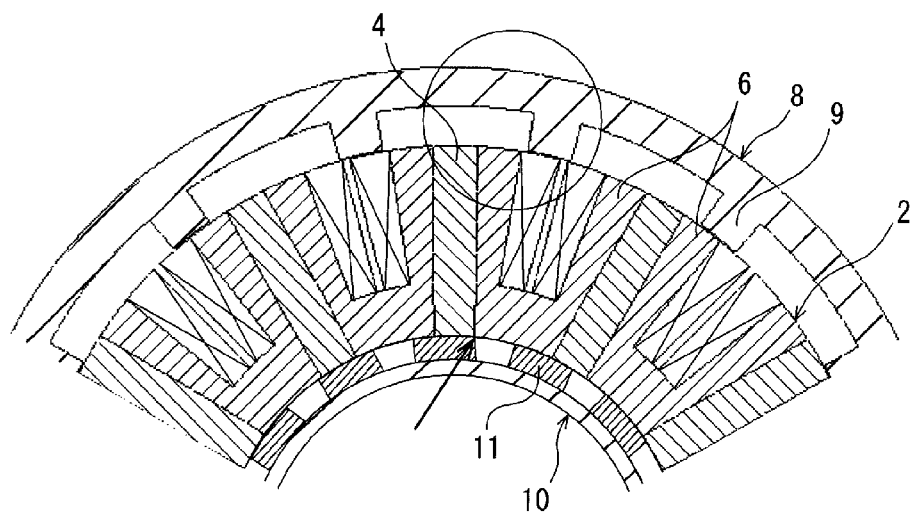

FIG. 3A and FIG. 3B each show the relationship between the permanent magnets 4, the outer-rotor 8, and the inner-rotor 10. FIG. 3A shows the state where the magnetic circuits of the permanent magnets 4 are shorted by the second salient poles 11 of the inner-rotor 10. Here, short of the magnetic circuit of each of the permanent magnet 4 means that a material having a magnetic permeability higher than the magnetic permeability of air is arranged on the magnetic circuit where the magnetic fluxes arising from the N pole of the permanent magnet 4 pass through an extending part 6 adjacent to the permanent magnet 4, pass through a first salient pole 9 or a second salient pole 11 corresponding in position to the permanent magnet 4, and enter into the S pole of the permanent magnet 4. In FIG. 3A, when at least one of the first salient poles 9 of the outer-rotor 8 corresponds in position with a certain portion of an extending part 6 that is adjacent, forward in the rotational direction (counterclockwise direction), to a permanent magnet 4 corresponding in position with the first salient pole 9 (see encircled part in FIG. 3A), at least one of the second salient poles 11 of the inner-rotor 10 forward in the rotational direction is aligned with the edge of the stator 2 that is on the side of the inner diameter thereof and is adjacent to the permanent magnet 4 forward in the rotational direction (see arrow in FIG. 3A). While in this state, short of the magnetic circuits of the permanent magnet 4 starts.

As the outer-rotor 8 and the inner-rotor 10, which are shown in FIG. 3A, rotate in conjunction with each other in the counterclockwise direction, the magnetic circuits of the permanent magnets 4 are increasingly shorted by the second salient poles 11 of the inner-rotor 10.

FIG. 3B shows the state where the second salient poles 11 of the inner-rotor 30 break the magnetic circuits of the permanent magnets 4. In FIG. 3B, when at least one of the first salient poles 9 of the outer-rotor 8 and the edge of an extending part 6 adjacent to a permanent magnet 4 backward in the rotational direction approach each other (see encircled part in FIG. 3B), at least one of the second salient poles 11 of the inner-rotor 10 backward in the rotational direction is aligned with the edge of the stator 2 that is on the side of the inner diameter thereof and is adjacent to the permanent magnet 4 backward in the rotational direction (see arrow in FIG. 3B).

As the outer-rotor 8 and the inner-rotor 10, which are shown in FIG. 3B, rotate in conjunction with each other in the counterclockwise direction, the magnetic circuits of the permanent magnets 4 by the second salient poles 11 of the inner-rotor 10 are increasingly broken.

Figure 4:
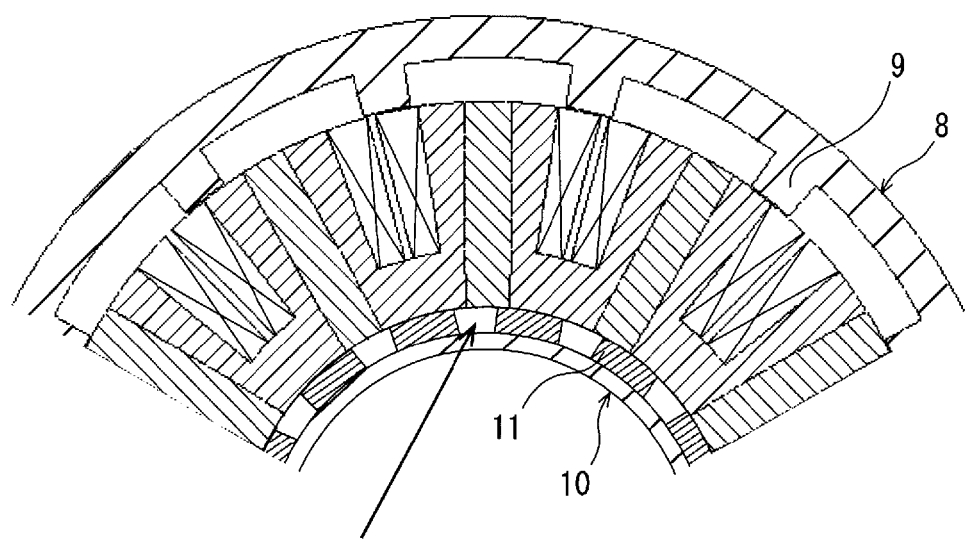
FIG. 4 is a schematic cross-sectional view showing the motor relating to Embodiment 1 for describing operations of the motor.

The following describes the positional relationship between the outer-rotor 8 and the inner-rotor 10, with reference to FIG. 4.

As shown in FIG. 4, components made of magnetic materials of the inner-rotor 10 are only the second salient poles (also called "salient teeth") 11. The outer-rotor 8 and the inner-rotor 10 are arranged at offset positions by substantially half a pitch. Here, it is preferable that the first salient poles 9 of the outer-rotor 8 and the second salient poles 11 of the inner-rotor 10 are arranged at offset positions by greater than just half a pitch, in other words, by not just half a pitch (see arrow in FIG. 4).

When the positional relationship between the outer-rotor 8 and the inner-rotor 10 is as shown in FIG. 3B and the maximum current is applied to the coils 5, the motor 1 produces the maximum torque. As shown in FIG. 3B, while the motor 1 produces the maximum torque, the second salient poles 11 of the inner-rotor 10 do not stride over the respective circumferential surfaces 4b of the permanent magnets 4 in the circumferential direction of the stator 2, and accordingly do not short the magnetic circuits of the permanent magnets 4. In other words, in the cross section of the motor 1 perpendicular to the axis C, an edge 11a1 of at least one of the second salient poles 11 forward in the clockwise direction is positioned on the circumferential surface 4b of a permanent magnet 4 adjacent to the second salient pole 11. This makes the outer-rotor 8 to produce torque due to the magnetic fluxes flowing from the permanent magnet 4 to the outer-rotor 8 through the circumferential surfaces 6a of the extending parts 6 and the circumferential surfaces 9a of the first salient poles 9.

According to FIG. 4, the inner-rotor 10 does not short the magnetic circuits of the permanent magnets 4, and torque is produced after the increase of effective magnetic fluxes that are effective for torque production.

The inner-rotor 10 shorts the magnetic circuits of the permanent magnets 4, and accordingly this suppresses the occurrence of demagnetization at application of the reverse magnetic field to the permanent magnets 4. Also, while the motor 1 produces the maximum torque, effective magnetic fluxes, which contribute to torque production by the outer-rotor 8, are increased with no short of the magnetic circuits of the permanent magnets 4. This achieves high torque of the motor 1.

<2> Comparison of Embodiment 1 with Comparative Examples

Figure 5A:
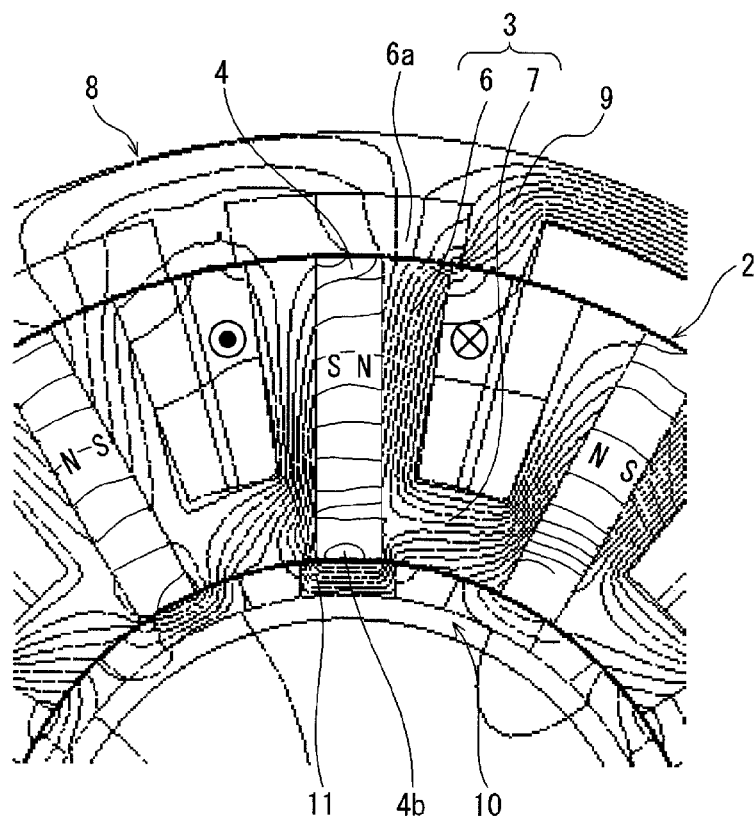
FIG. 5A and FIG. 5B each show magnetic flux lines inside the motor relating to Embodiment 1.
Figure 5B:
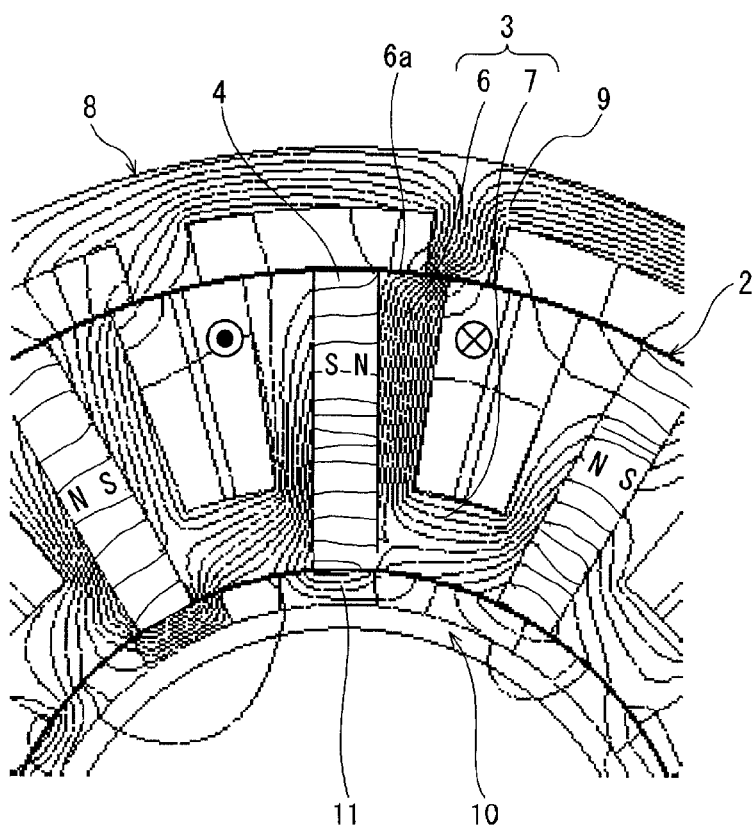
Figure 6:
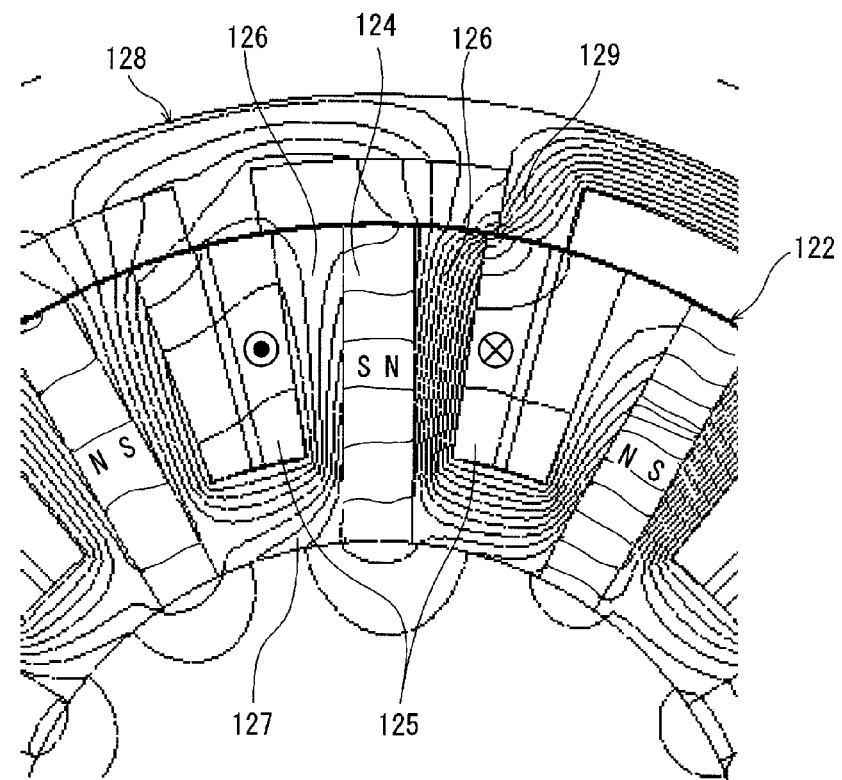
FIG. 6 shows magnetic flux lines inside a motor relating to Comparative Example 1.
Figure 7:
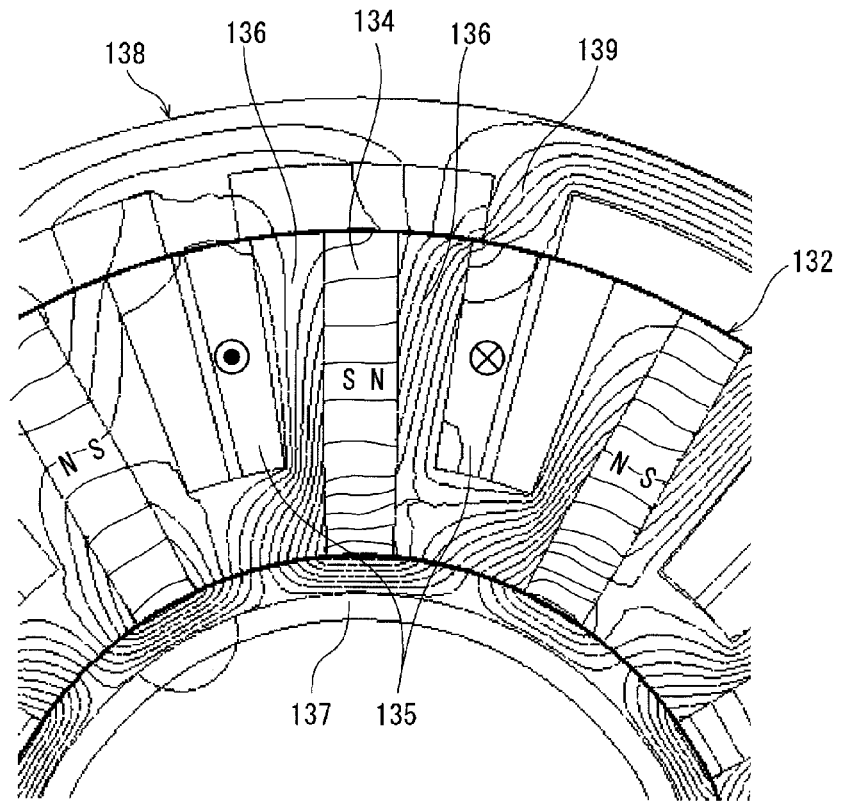
FIG. 7 shows magnetic flux lines inside a motor relating to Comparative Example 2.

FIG. 5A and FIG. 5B each show results of magnetic field analysis on the motor relating to the present embodiment. Also, FIG. 6 shows results of magnetic flux lines inside a motor relating to Comparative Example 1 that includes a stator 122 having no yoke arranged therewithin. FIG. 7 shows results of magnetic flux lines inside a motor relating to Comparative Example 2 that includes a stator 132 having a stator yoke 137 arranged therewithin.

As the permanent magnets 4, magnets each having an energy product of 150 $kJ/m^3$ are adopted. In the present embodiment, ferrite magnets each having an energy product of 42 $kJ/m^3$ are adopted as the permanent magnets 4.

According to the motor relating to Comparative Example 1 shown in FIG. 6, a rotor 128 having a plurality of salient poles 129 is arranged outside the stator 122. Permanent magnets 124 arranged inside the stator 122 are magnetized in the circumferential direction so as to each have the N pole on the right side and the S pole on the left side. Note that the permanent magnet 124 is in contact with, at each end thereof in the lateral direction, an extending part 126 extending in the radial direction of the stator 122. Also, two extending parts 126 are connected with each other via a connecting part 127. In FIG. 6, current flows to a coil 125 arranged on the right side facing each of the permanent magnets 124 in the lower direction in the figure, and current flows to a coil 125 arranged on the left side facing the permanent magnet 124 in the upper direction in the figure. This results in torque production by the rotor 128 in the counterclockwise direction. The following describes the motor relating to Comparative Example 1 based on the assumption that the rotor 128 produces torque of 1 p.u.

According to the motor shown in FIG. 6, the inner side of each of the permanent magnets 124 of the stator 122 is opened, and this causes magnetic fluxes flowing through the permanent magnet 124 to flow through an air space inside the stator 122. This results in the decrease in magnetic permeability of the magnetic circuit flowing through the permanent magnet 124, and leads to the decrease in permeance coefficient of the permanent magnet 124. In the state shown in FIG. 6, the permanent magnet 124 has a permeance coefficient of 0.30. In the case where the permeance coefficient decreases, application of reverse magnetic field to the permanent magnet 124 tends to cause demagnetization. The motor relating to Comparative Example 1 adopts, as the permanent magnets 124, ferrite magnets that are generally considered to each have a low energy product of 42 $kJ/m^3$. Accordingly, compared with adoption of rare earth magnets each having a high energy product of 350 $kJ/m^3$ as the permanent magnets 124, in the case where the reverse magnetic field is applied to the permanent magnets 124 during energization to the coils 125, the permanent magnets 124 are subject to demagnetization. This leads to decrease in capability of the motor.

A motor relating to Comparative Example 2 shown in FIG. 7 differs from the motor relating to Comparative Example 1 shown in FIG. 6 in that the stator yoke arranged inside the stator 132 partially constitutes magnetic circuits that short the N pole and the S pole of permanent magnets 134. Similar to the motor relating to Comparative Example 1 shown in FIG. 6, according to the motor relating to Comparative Example 2, a rotor 138 having a plurality of salient poles 139 is arranged outside the stator 132. Permanent magnets 134 arranged inside the stator 132 are magnetized so as to each have the N pole on the right side and the S pole on the left side in the circumferential direction. Also, the permanent magnet 134 is in contact with, at each end thereof in the lateral direction, an extending part 136 extending in the radial direction of the stator 132. In FIG. 7, current flows to a coil 135 arranged on the right side facing the permanent magnet 134 in the lower direction in the figure, and current flows to a coil 135 arranged on the left side facing the permanent magnet 134 in the upper direction in the figure. This results in torque production by the rotor 138 in the counterclockwise direction.

According to the motor shown in FIG. 7, the stator yoke 137 shorts the magnetic circuits inside the stator 132. This increases the magnetic permeability of the magnetic circuits passing through the permanent magnets 134, thereby increasing the permeance coefficient of the permanent magnets 134. In the state shown in FIG. 7, the permanent magnets 134 each have a permeance coefficient of 1.06, and are resistant to demagnetization. This is reflected to the increase in magnetic fluxes passing through the permanent magnet 134 shown in FIG. 7, compared with the example shown in FIG. 6.

By the way, compared with the motor shown in FIG. 6, according to the motor shown in FIG. 7, the magnetic fluxes of the permanent magnets 134 flowing to the rotor 138 decrease in proportion to the increase of the magnetic fluxes shorted by the stator yoke 137. This means the decrease in magnetic fluxes that contribute to torque production by the rotor 138. Actually, in the case where the rotor shown in FIG. 6 produces torque of 1 p.u., the rotor 138 produces torque of 0.78 p.u. That is, torque produced in the example shown in FIG. 7 is lower than the torque produced in the example shown in FIG. 6.

According to the motor 1 relating to the present embodiment includes, as shown in FIG. 5A, the permanent magnets 4 are magnetized so as to each have the N pole on the right side and the S pole on the left side in the circumferential direction of the stator 2. In FIG. 5, current flows to a coil 5 arranged on the right side facing each of the permanent magnets 4 in the lower direction in the figure, and current flows to a coil 5 arranged on the left side facing the permanent magnet 4 in the upper direction in the figure. This results in torque production by the outer-rotor 8 in the counterclockwise direction.

In the state shown in FIG. 5A, an edge surface 6a of each of the extending parts 6 does not correspond in position to any of the first salient poles 9 of the outer-rotor 8. However, at least one of the second salient poles 11 of the inner-rotor 10, which has the same rotational axis as the outer-rotor 8 so as to rotate in conjunction with the outer-rotor 8 and is arranged inside the stator 2, corresponds in position to an edge surface 4b of a permanent magnets 4. This second salient pole 11 shorts the magnetic circuit of the permanent magnet 4. This increases the permeance coefficient of the permanent magnet 4, thereby suppressing the demagnetization of the permanent magnet 4.

FIG. 5B shows the state where the outer-rotor 8 and inner-rotor 10, which are shown in FIG. 5A, have rotated in the counterclockwise direction.

In the state shown in FIG. 5B, at least one of the first salient poles 9 of the outer-rotor 8 approaches the edge surface 6a of an extending part 6, magnetic fluxes flow from the extending part 6 to the first salient pole 9 of the outer-rotor 8, and as a result the outer-rotor 8 produces torque in the counterclockwise direction. At this time, the inner-rotor 10, which is coupled to the rotational axis of the outer-rotor 8, rotates in the counterclockwise direction together with the outer-rotor 8. On the other hand, the second salient poles 11 of the inner-rotor 10 each do not circumferentially stride over the edge of the permanent magnets 4, and this results in no circuit-short of magnetic fluxes by the second salient pole 11. As a result, most of the magnetic fluxes of the permanent magnet 4 flow to the outer-rotor 8, thereby contributing to torque production by the outer-rotor 8. Also, although the permanent magnets 4 shown in FIG. 5B each have a permeance coefficient of 0.70 that is lower than the example shown in FIG. 7, the outer-rotor 8 shown in FIG. 5B produces torque of 1.08 p.u. that is higher than the torque produced in the example shown in FIG. 7.

<3> Effects

The following describes effects exhibited by the motor 1 relating to the embodiment 1.

Rare earth metals such as neodymium and dysprosium are produced only in limited areas on the earth, and reserves of the rare earth metals are extremely little. This leads to the demand for adopting, as permanent magnets, ferrite magnets that are more easily available than the rare earth magnets.

According to the motor 1 relating to the present embodiment, even in the case where magnets each having a low energy product are adopted as the permanent magnets 4, such as ferrite magnets each having an energy product of 42 kJ/m$^3$, the permeance coefficient of the permanent magnets 4 increases. Therefore, this suppresses demagnetization due to the energization to the coils 5, compared with Comparative Example 1 shown in FIG. 6.

Also, according to the motor 1, while the outer-rotor 8 or the inner-rotor 10 produces torque, short of the magnetic circuits of the permanent magnets 4 is temporarily suspended. This achieves high torque, compared with Comparative Example 2 shown in FIG. 7.

Furthermore, according to the motor 1, the coils 5 are each wound by concentrated winding on two extending parts 6. This reduces the size of respective coil ends of the coils 5, thereby reducing the size of the whole motor 1 and reducing the joule loss (i.e. copper loss), compared with the case where the distributed-winding is adopted. This achieves high efficiency.

Moreover, the motor 1 is an outer-rotor motor, and torque production is contributed to by mainly the outer-rotor 8. Accordingly, compared with an inner-rotor motor where torque production is contributed to by mainly an inner-rotor, the motor 1 has a rotor contributing to torque production has a larger diameter than that of the inner-rotor motor as long as the motor 1 is equal in size to the inner-rotor motor. Therefore, compared with the inner-rotor motor, as long as the inner-rotor and the outer-rotor have the same number of salient poles such as described in the present embodiment, a long distance is provided between each two adjacent salient poles in the circumferential direction of the rotor. This reduces an amount of magnetic fluxes leaking to each adjacent salient pole while the rotor produces torque, thereby preventing reduction in effective magnetic fluxes while torque is produced.

Embodiment 2

Figure 8:
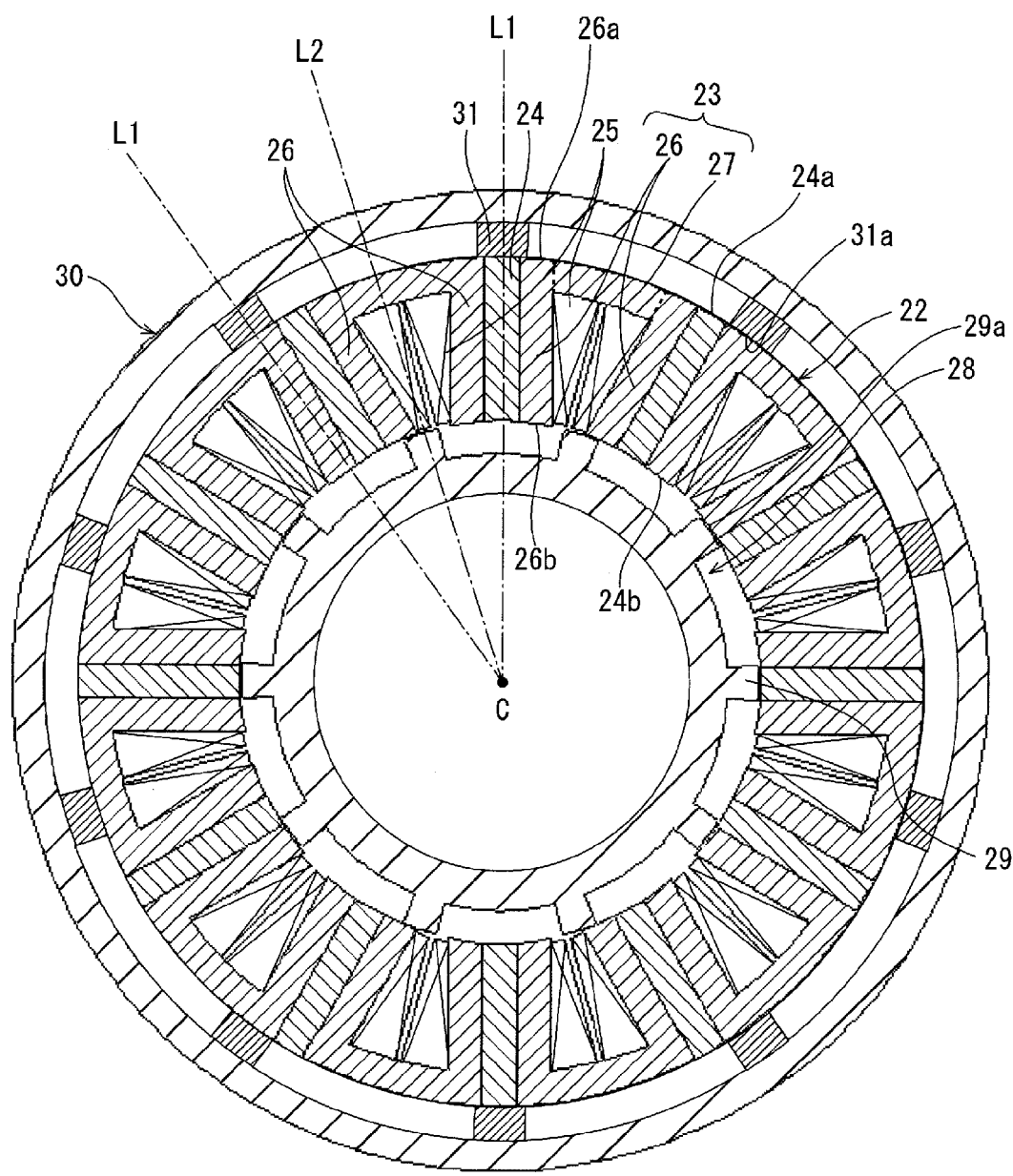
FIG. 8 is a schematic cross-sectional view showing a motor relating to Embodiment 2.

FIG. 8 shows the structure of a motor 21 relating to the present embodiment.

The motor 21 includes an annular stator 22, an annular outer-rotor 30, and an annular inner-rotor 28. The outer-rotor 30 is arranged outside the stator 22, and has the rotational axis coincident with the central axis of the stator 22. The inner-rotor 28 is arranged inside the stator 22, and has the rotational axis coincident with the central axis of the stator 22 so as to rotate in conjunction with the outer-rotor 30. The stator 2 includes 12 permanent magnets 24 arranged at regular spaced intervals in a circumferential direction thereof, 12 stator cores 23 that are each arranged between two adjacent permanent magnets 24, and 12 coils 25. In the following, with respect to the structure that is the same as that relating to Embodiment 1, description thereof is appropriately omitted.

The outer-rotor 30 has 10 first salient poles 31 each projecting inward, and the inner-rotor 28 has 10 second salient poles 29 each projecting outward. The first salient poles 31 and the second salient poles 29 are arranged so as to be rotation-symmetrical. Also, the first salient poles 31 of the outer-rotor 30 and the second salient poles 29 of the inner-rotor 28 are arranged such that, in the cross section perpendicular to the axial direction, the center of each of the second salient poles 29 is positioned on the axis of symmetry L2 of two line segments L1 connecting the axis C with the respective centers of any two adjacent of the first salient poles 31.

The stator cores 23 are, in the same way as in Embodiment 1, each have two extending parts 26 that each extend in the radial direction of the stator 22 and a connecting part 27 that connects the two extending parts 26 with each other, and has substantially a U-shaped cross section perpendicular to the direction of the axis C. The present embodiment differs from Embodiment 1 in that the stator cores 23 are each arranged such that the connecting part 27 faces the side of the outer-rotor 30. This results in that torque production is contributed to by mainly the inner-rotor 28. Also, in the same way as in Embodiment 1, in the cross section perpendicular to the direction of the axis C, the extending parts 26 each have a circumferential surface 26a at one end thereof and a circumferential surface 26b at the other end thereof in the radial direction of the stator 22. The circumferential surface 26a is substantially parallel to the end surface (circumferential surface) of the first salient pole 29 adjacent to the extending part 26, the circumferential surface 26b is substantially parallel to the end surface 29a of the second salient pole 11 adjacent to the extending part 26.

Also, in the cross section perpendicular to the direction of the axis C, the permanent magnets 24 each have a circumferential surface 24a at one end thereof and a circumferential surface 24b at the other end thereof in the radial direction of the stator 22. The circumferential surface 24a is substantially parallel to the end surface 31a of the first salient pole 31 adjacent to the permanent magnet 24. Furthermore, as described above, since the circumferential surface 26b of each of the extending parts 26 is substantially parallel to the end surface of the first salient pole 31 adjacent to the extending part. This reduces the size of a space generated between the circumferential surface 26a of the extending part 26 and the end surface of the first salient pole 31 and the size of a space generated between the circumferential surface 24a of the permanent magnet 24 and the end surface of the first salient pole 31. Also, the permanent magnets 24 are magnetized in substantially the circumferential direction of the stator 22, such that each two adjacent permanent magnets 24 have the identical poles facing each other in the circumferential direction of the stator 22.

The coils 25 are each wound by concentrated-winding on a group of a permanent magnet 24 and respective two extending parts 26 of two stator cores 22 adjacent to the permanent magnet 24. The coils 25 are arranged in order of the U-phase, the V-phase, and the W-phase in the circumferential direction of the stator 22.

Figure 9A:
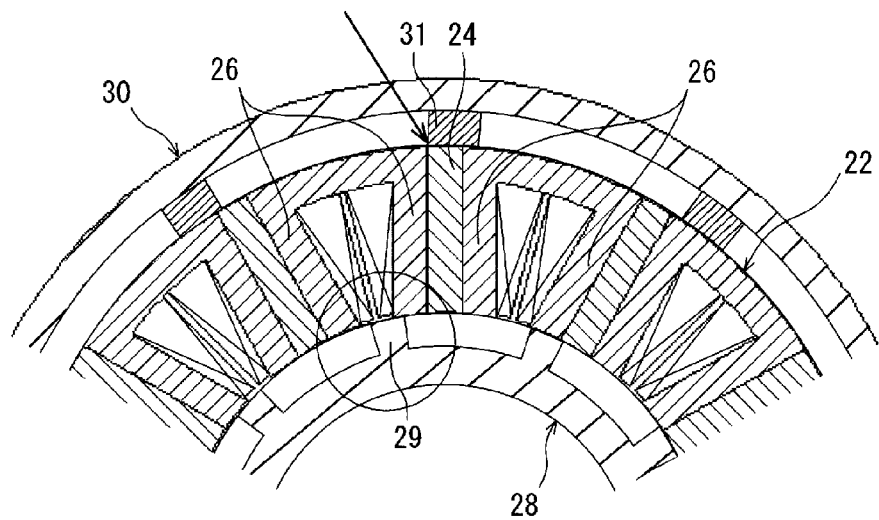
FIG. 9A and FIG. 9B are each a schematic cross-sectional view showing the motor relating to Embodiment 2 for describing operations of the motor.
Figure 9B:
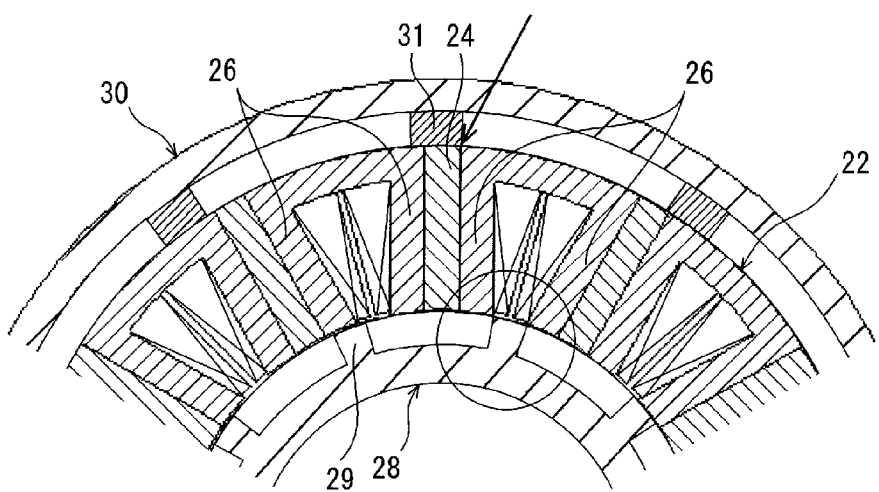

FIG. 9A and FIG. 9B each show the relationship among the permanent magnets 24, the outer-rotor 30, and the inner-rotor 28. FIG. 9A shows the state where the magnetic circuits of the permanent magnets 24 are shorted by the first salient poles 31 of the outer-rotor 30. Here, short of the magnetic circuit of each of the permanent magnet 24 means that a material having a magnetic permeability higher than the magnetic permeability of air is arranged on the magnetic circuit where the magnetic fluxes arising from the N pole of the permanent magnet 24 pass through an extending part 26 adjacent to the permanent magnet 24, pass through a first salient pole 31 or a second salient pole 29 corresponding in position to the permanent magnet 24, and enter into the S pole of the permanent magnet 24. In FIG. 9A, when at least one of the second salient poles 29 of the inner-rotor 28 corresponds in position with a certain portion of an extending part 26 that is adjacent, forward in the rotational direction (counterclockwise direction), to a permanent magnet 24 corresponding in position with the second salient pole 29 (see encircled part in FIG. 9A), at least one of the first salient poles 31 of the outer-rotor 30 forward in the rotational direction is aligned with the edge of the stator 22 on the side of the outer diameter thereof and adjacent to the permanent magnet 24 forward in the rotational direction (see arrow in FIG. 9A).

As the outer-rotor 30 and the inner-rotor 28, which are shown in FIG. 9A, rotate in conjunction with each other in the counterclockwise direction, the magnetic circuits of the permanent magnets 24 are increasingly shorted by the first salient poles 31 of the outer-rotor 30.

FIG. 9B shows the state where the first salient poles 31 of the outer-rotor 30 break the magnetic circuits of the permanent magnets 24. In FIG. 9B, when at least one of the second salient poles 29 of the inner-rotor 28 and the edge of an extending part 26 adjacent to a permanent magnet 24 backward in the rotational direction approach each other (see encircled part in FIG. 9B), at least one of the first salient poles 31 of the outer-rotor 30 backward in the rotational direction is aligned with the edge of the stator 22 that is on the side of the outer diameter thereof and is adjacent to the permanent magnet 24 backward in the rotational direction (see arrow in FIG. 9B).

As the outer-rotor 30 and the inner-rotor 28, which are shown in FIG. 9B, rotate in conjunction with each other in the counterclockwise direction, the magnetic circuits of the permanent magnets 24 by the first salient poles 31 of the outer-rotor 30 are increasingly broken.

Components made of magnetic materials of the outer-rotor 30 are only the first salient poles (also called "salient teeth") 31. The inner-rotor 28 and the outer-rotor 30 are arranged at offset positions by substantially half a pitch. Here, as shown in FIG. 9A and FIG. 9B, it is preferable that the second salient poles 29 of the inner-rotor 28 and the first salient poles 31 of the outer-rotor 30 are arranged at offset positions by greater than just half a pitch. Note that part other than the first salient poles 31 of the outer-rotor 30 may be also made of a magnetic material.

When the positional relationship between the outer-rotor 30 and the inner-rotor 28 is as shown in FIG. 9B and the maximum current is applied to the coils 25, the motor 21 produces the maximum torque. As shown in FIG. 9B, while the motor 21 produces the maximum torque, the respective circumferential surfaces 31a of the first salient poles 31 of the outer-rotor 30 do not stride across the respective circumferential surfaces 24a of the permanent magnets 24 in the circumferential direction of the stator 22, such that the first salient poles 31 do not short the magnetic circuits of the permanent magnets 24. In other words, in the cross section of the motor 21 perpendicular to the axis C, an edge 31a1 of at least one of the first salient poles 31 forward in the clockwise direction is positioned on the circumferential surface 24b of a permanent magnet 24 adjacent to the first salient pole 31. This makes the inner-rotor 28 to produce torque due to the magnetic fluxes flowing from the permanent magnet 24 to the inner-rotor 28 through the circumferential surfaces 26b of the extending parts 26 and the circumferential surfaces 29a of the second salient poles 29.

As described above, the outer-rotor 28 or the inner-rotor 30 shorts the magnetic circuits 24 of the permanent magnets 24, and accordingly this suppresses the occurrence of demagnetization at application of the reverse magnetic field to the permanent magnets 24. Also, while the motor 21 produces the maximum torque, effective magnetic fluxes, which contribute to torque production by the rotor, are increased with no short of the magnetic circuits of the permanent magnets 24. This achieves high torque of the motor 21.

MODIFICATION EXAMPLES

Although the motor relating to the present invention has been described above based on the embodiments, the present invention is not limited to these embodiments. For example, the present invention may include the following modification examples.

(1) The above Embodiment 1 has described the example where while the outer-rotor 8 produces no torque, the second salient poles 11 short magnetic circuits of the permanent magnets 4. Alternatively, the time period while the outer-rotor 8 produces torque may partially overlaps with the time period while the second salient poles 11 short the magnetic circuits of the permanent magnets 4, for example.

(2) In the above Embodiments 1 and 2, skew arrangement may be employed according to which as the respective coils 5 and 25 of the stators 2 and 22 proceed in the axial direction of the outer-rotors 8 and 30 and the inner-rotors 10 and 28, respectively, the interval between each two adjacent coils 5 of the stator 2 and the interval between each two adjacent coils 25 of the stator 22 are spaced at the maximum in the circumferential direction, respectively.

(3) In the above Embodiments 1 and 2, the first salient poles of the outer-rotor and the second salient poles of the inner-rotor may be arranged in a fixed smooth skew or a gradual skew.

(4) The above Embodiments 1 and 2 have described the example of the motor that is a dual-rotor motor having a radial air gap that is provided in the radial direction. Alternatively, a dual-rotor motor having an axial air gap that is provided in the axial direction may be adopted.

(5) In the above Embodiments 1 and 2, current to be applied to the coils may have a sine wave form or a rectangular wave form.

(6) The above Embodiment 1 has described the example where the motor 1 includes the outer-rotor 8 having 14 first salient poles 9, the inner-rotor 10 having 14 second salient poles 11, 24 extending parts 6, and 12 coils 5. Alternatively, the motor 1 may include the outer-rotor 8 having 14n first salient poles 9, the inner-rotor 10 having 14n second salient poles 11, 24n extending parts 6, and 12n coils 5, where n is an integer greater than one.

(7) The above Embodiment 2 has described the example where the motor 21 includes the outer-rotor 30 having 10 first salient poles 31, the inner-rotor 28 having 10 second salient poles 29, 24 extending parts 26, and 12 coils 25. Alternatively, the motor 21 may include the outer-rotor 30 having 10n first salient poles 31, the inner-rotor 28 having 10n second salient poles 29, 24n extending parts 26, and 12n coils 25, where n is an integer greater than one.

(8) The above Embodiment 1 has described the example where the second circumferential surface 4b of each of the permanent magnets 4 is smaller in width in the circumferential direction of the stator 2 than the circumferential surface 11a of each of the second salient poles 11. Alternatively, even in the case where, for example, the second circumferential surface 4b of each of the permanent magnets 4 is larger in width in the circumferential direction of the stator 2 than the circumferential surface 11a of each of the second salient poles 11, the effective magnetic permeability in the magnetic circuit of each of the permanent magnets 4 is increased, thereby increasing the permeance coefficient of the permanent magnet 4. This exhibits an effect of suppressing demagnetization.

(9) The above Embodiments 1 and 2 have described the example where the first salient poles 9 and the second salient poles 11 are arranged and the first salient poles 31 and the second salient poles 29 are arranged, such that, in the cross section perpendicular to the direction of the axis C, the center of each of the first salient poles 9 and 31 is positioned on the axis of symmetry of respective two line segments L1 connecting the center of any two adjacent of the first salient poles 9 and 31, respectively. In other words, the above Embodiments 1 and 2 have described the example where the first salient poles 9 and the second salient poles 11 are arranged and the first salient poles 31 and the second salient poles 29 are arranged at offset positions by half a cycle of arrangement thereof. Alternatively, the offset size may be a smaller than the half the cycle of the arrangement.

(10) The above Embodiment 1 has described the example where each two adjacent extending parts 6, which sandwich a permanent magnet 4 therebetween, have a distance therebetween in the circumferential direction of the stator 2 that is substantially equal between in the outside of the stator 2 and the inside of the stator 2. Alternatively, as shown in FIG. 10A for example, each two adjacent extending parts 6 may have a distance therebetween in the circumferential direction of the stator 2 that increases from the outside of the stator 2 toward the inside of the stator 2.

Figure 10A:
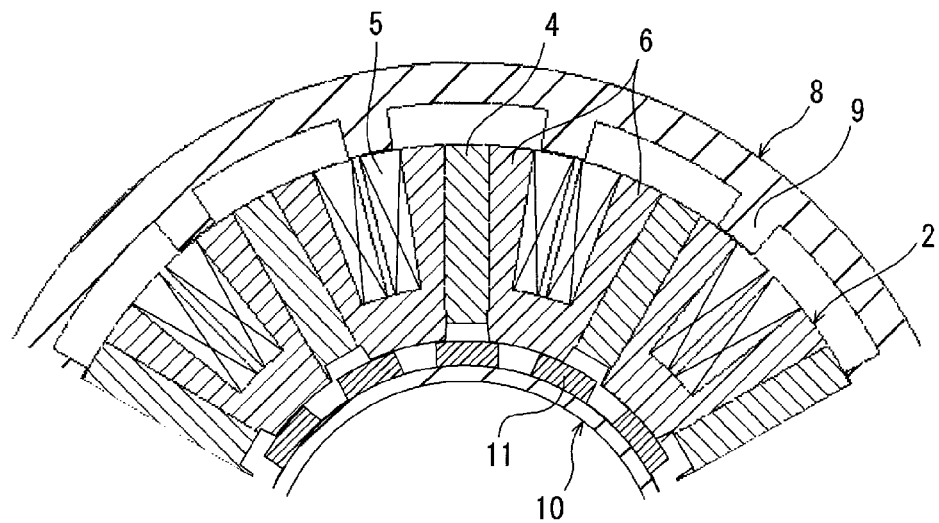
FIG. 10A, FIG. 10B, and FIG. 10C are each a schematic cross-sectional view showing a motor relating to a modification example.
Figure 10B:
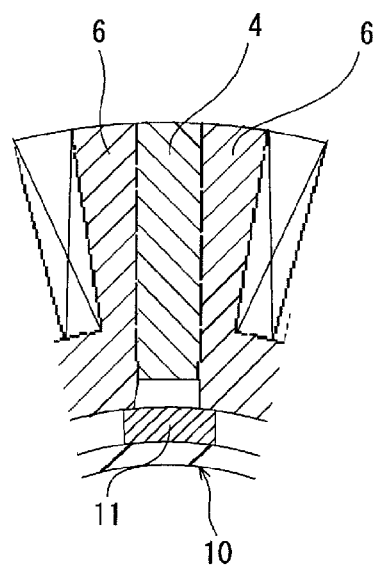

Further alternatively, as shown in FIG. 10B for example, in order to increase the distance in the circumferential direction of the stator 2 between each two adjacent extending parts 6, which sandwich a permanent magnet 4 therebetween, from the outside of the stator 2 toward the inside of the stator 2, one of the two adjacent extending parts 6 may have an inclined side surface on the side facing the permanent magnet 4.

The respective structures shown in FIG. 10A and FIG. 10B reduce the size of each of the permanent magnets 4, thereby achieving reduction in material costs and weight of the motor 1.

Figure 10C:
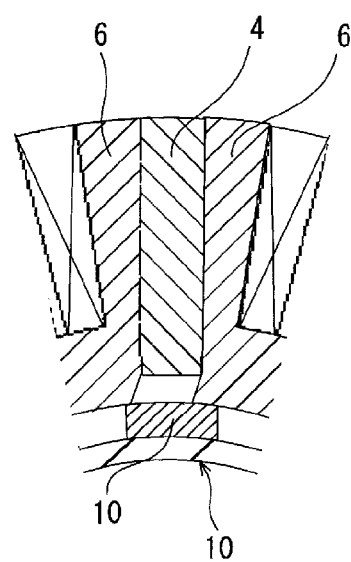

Yet alternatively, as shown in FIG. 10C, each two adjacent extending parts 6, which sandwich a permanent magnet 4 therebetween, each may have an inclined side surface on the side facing the permanent magnet 4 that is inclined in the circumferential direction of the stator 2 on the inner side of the stator 2.

The structure shown in FIG. 10C changes the balance of forces acting on the outer-rotor 8 and the inner-rotor 10, thereby achieving reduction in vibration.

(11) The above Embodiment 1 has described the example where the stator cores 3 each have two extending parts 6 that each extend from the inner-rotor 10 toward the outer-rotor 8 in the radial direction of the stator 2 and a connecting part 7 that connects the two extending parts 6 with each other on sides thereof facing the inner-rotor in the radial direction, and has substantially a U-shaped cross section perpendicular to the direction of the axis C. Alternatively, as shown in FIG. 11 for example, a connecting part 7 may be arranged at an offset position from respective ends of two extending parts 6 toward the outer-rotor 8 in the radial direction of the stator 2, and the edge surface of a permanent magnet 4 adjacent to the extending parts 6 on the side facing the inner-rotor 10 may be arranged at offset position outward from the edge surface of the connecting part 7 on the side facing the inner-rotor 10.

Figure 11:
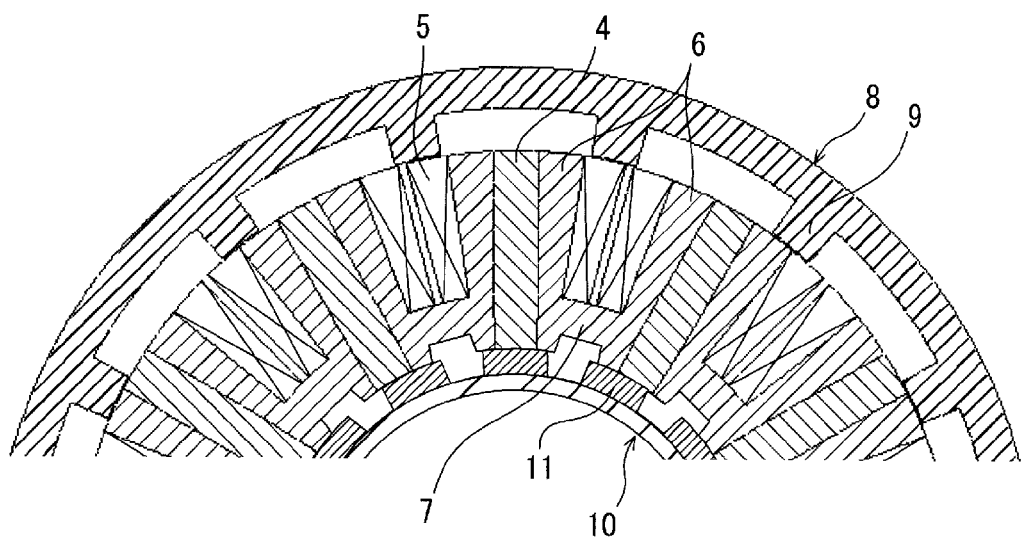
FIG. 11 is a schematic cross-sectional view showing a motor relating to a modification example.

The structure shown in FIG. 11 reduces an amount of magnetic fluxes leaking to the inner-rotor 10 from the extending parts 6 through the second salient poles 11, thereby increasing the effective magnetic fluxes to achieve high torque.

Figure 12:
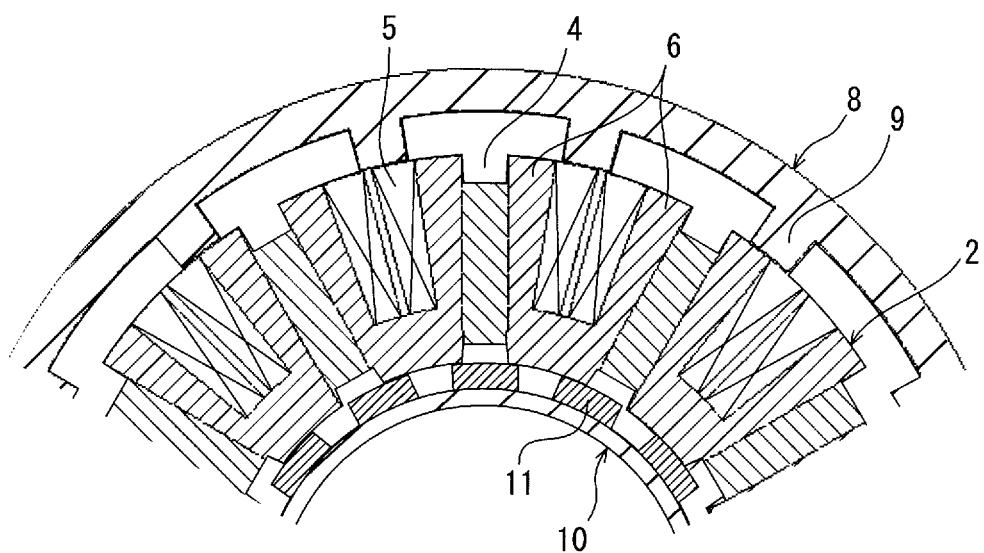
FIG. 12 is a schematic cross-sectional view showing a motor relating to a modification example.

(12) The above Embodiment 1 has described the example where the outer circumferential surface of each of the permanent magnets 4 and respective outer circumferential surfaces of two extending parts 6 adjacent to the permanent magnet 4 sandwiched therebetween are substantially aligned with each other in the radial direction. Alternatively, as shown in FIG. 12 for example, the permanent magnet 4 may be arranged so as to have the outer circumferential surface that is recessed in the radial direction against the respective outer circumferential surfaces of the two extending parts adjacent to the permanent magnet 4.

Here, the permanent magnet 4 is magnetized in the circumferential direction of the stator 2, and the magnetic fluxes of the permanent magnet 4 flow from the two extending parts 6 adjacent to the permanent magnet 4 to the outer-rotor 8 through the air gap. In the case where the edge surface of the permanent magnet 4 is aligned with the edge surface of the stator 2 on the same surface, the edge surface of the permanent magnet 4 is influenced by magnetic fluxes flowing into the stator 2. This might result in local demagnetization of the permanent magnet 4 due to local application of the strong reverse magnetic field to the permanent magnet 4.

In view of this, according to the present modification example, an interval is provided between the outer circumferential surface of the permanent magnet 4 and the air gap (space generated between the outer-rotor 8 and the stator 2). This reduces the action on the magnetic fluxes of the permanent magnet 4 performed by the magnetic fluxes flowing from the outer-rotor 8 through the air gap in the radial direction, thereby suppressing the demagnetization of the permanent magnet 4.

(13) The shape of the inner-rotor 10 relating to the above Embodiment 1 is not limited to the shape shown in FIG. 1.

FIG. 13A, FIG. 13B, FIG. 14A, and FIG. 14B each show a partial cross-sectional view of a motor relating to the present modification example. In FIG. 13A, FIG. 13B, FIG. 14A, and FIG. 14B, the components that are the same as those of the motor relating to Embodiment 1 have the same numerical references, and description thereof is appropriately omitted. The respective motors relating to the present modification example have inner-rotors 210, 310, 410, and 510 that differ in shape from the inner-rotor 10 relating to Embodiment 1.

Figure 13A:
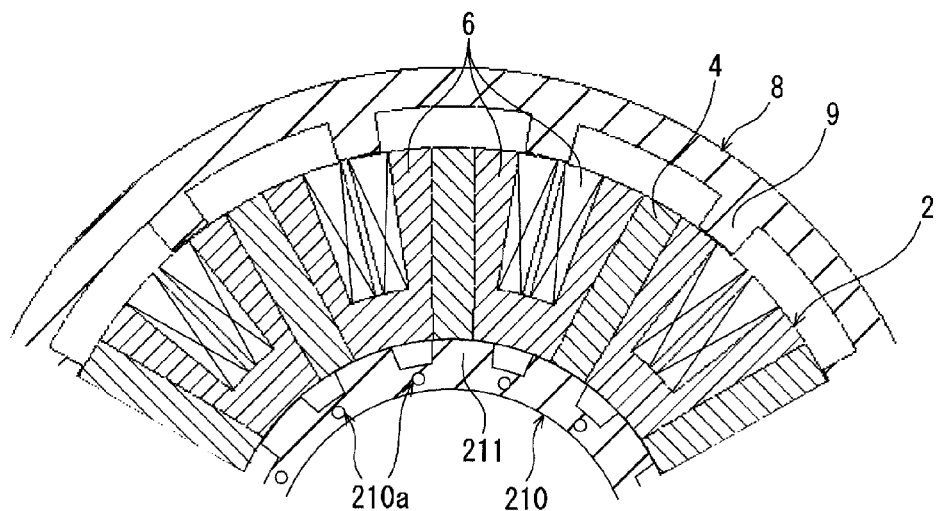
FIG. 13A and FIG. 13B are each a schematic cross-sectional view showing a motor relating to a modification example.

As shown in FIG. 13A, each two adjacent second salient poles 211 may have a through-hole 210a therebetween so as to penetrate through in the central axial direction of the inner-rotor 210.

Figure 13B:
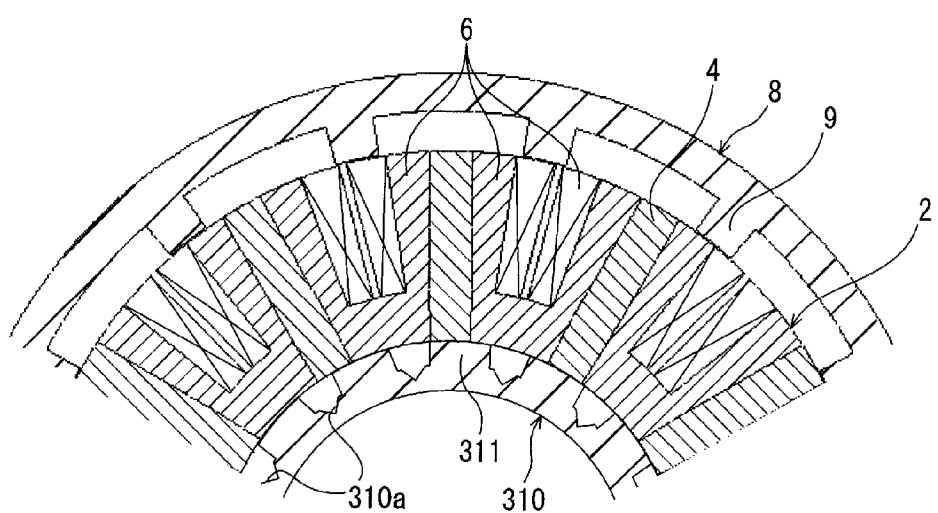

Also, as shown in FIG. 13B, a part between each two adjacent second salient poles 311 has a groove 310a on a circumferential surface thereof on the projection side of the second salient poles 311.

Figure 14A:
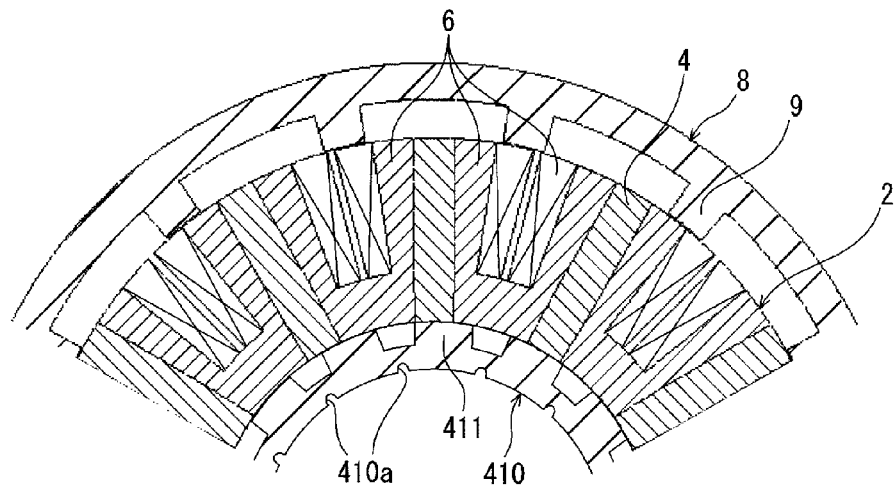
FIG. 14A and FIG. 14B are each a schematic cross-sectional view showing a motor relating to a modification example.

Furthermore, as shown in FIG. 14A, a part between each two adjacent second salient poles 411 has a groove 410a on a circumferential surface thereof on the side that is opposite to the projection side of the second salient poles 411.

Note that the grooves 310a and 410a each may have a cross section having a sphenoidal shape (see FIG. 13B), a semicircular shape (see FIG. 14A), or other shape.

According to the respective structures of the inner-rotors 210, 310, and 410, each two adjacent second salient poles 211, each two adjacent second salient poles 311, and each two adjacent second salient poles 411 each have a part therebetween whose cross-sectional area decreases in the direction perpendicular to the respective circumferential directions of the inner-rotors 210, 310, and 410. This reduces magnetic fluxes shorted between each two adjacent second salient poles 211, each two adjacent second salient poles 311, and each two adjacent second salient poles 411, thereby reducing magnetic fluxes flowing from the extending parts 6 to the inner-rotors 210, 310, and 410. This increases magnetic fluxes flowing from the extending parts 6 to the first salient poles 9 of the outer-rotor 8, in proportion to the reduction in magnetic fluxes flowing from the extending parts 6 to the inner-rotors 210, 310, and 410. As a result, the increase in magnetic fluxes flowing to the outer-rotor 8, which contributes to torque production, leads to achievement of high torque.

Figure 14B:
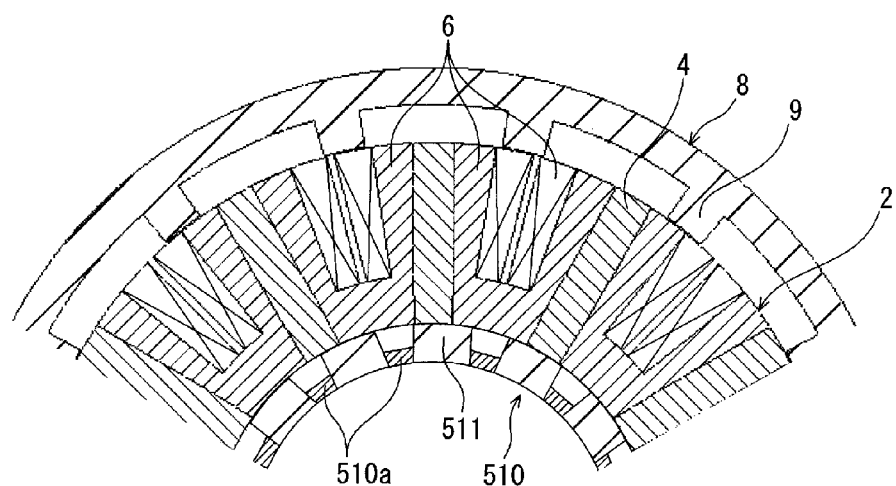

Also, as shown in FIG. 14B, each two adjacent second salient poles 511 of an inner-rotor 510 may have therebetween a part 510a having deteriorated magnetic properties, namely, having a deteriorated magnetic permeability. The inner-rotor 510 having this structure also reduces magnetic fluxes shorted between each two adjacent second salient poles 511, thereby reducing magnetic fluxes flowing from the extending parts 6 to the inner-rotor 510.

Figure 15A:
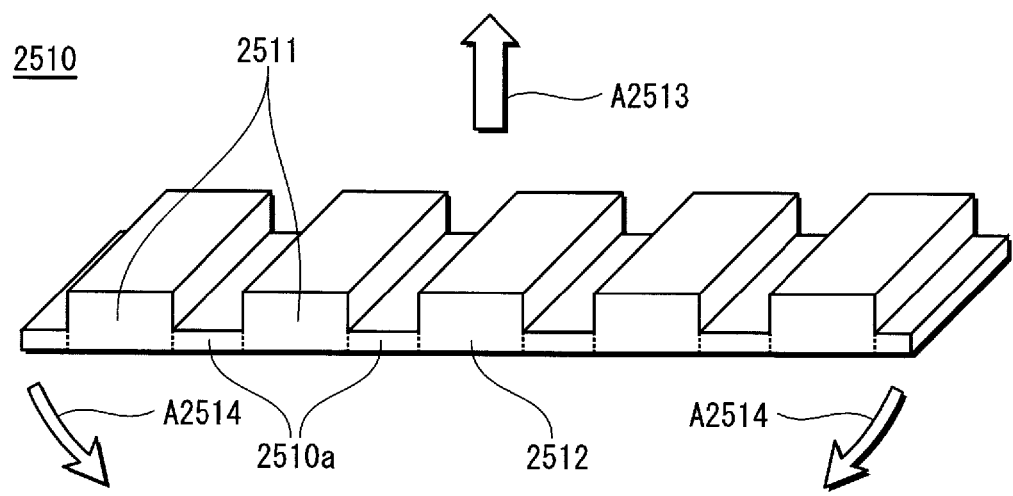
FIG. 15A and FIG. 15B each show a method of manufacturing an inner-rotor relating to the modification example.
Figure 15B:
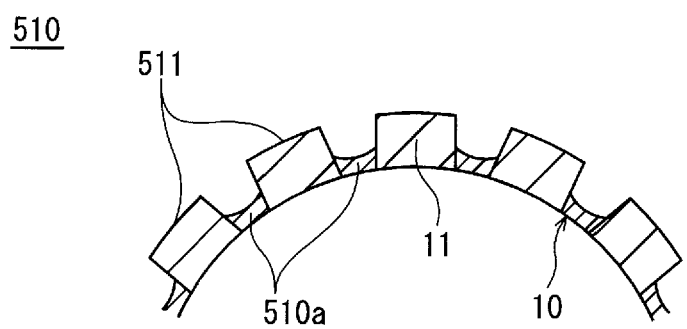

FIG. 15A and FIG. 15B each show a method of manufacturing the inner-rotor 510 having the structure shown in FIG. 14B.

Firstly, a base member 2510 is prepared, as shown in FIG. 15A. The base member 2510 includes a rectangular plate member 2512 having 14 protrusions 2511 arranged on one of surfaces thereof. The protrusions 2511 serve as a base for the second salient poles 511, and are arranged in a direction perpendicular to the protruding direction of thereof.

Next, toward the center of the base member 2510, force is applied in the protruding direction of the protrusions 2511 (see arrow A2513 in FIG. 15A). Also, toward the both ends of the base member 2510 in the arrangement direction of the protrusions 2511, force is applied in the direction opposite to the protruding direction of the protrusions 2511 (see arrow A2514 in FIG. 15A). As a result, the base member 2510 is gradually curved. At this time, a part 2510a between each two adjacent protrusions 2511 of the base member 2510 is intensively curved. Then, the both ends of the base material 2510 are connected with each other by welding or the like, and this results in completion of the inner-rotor 510 (FIG. 15B).

Here, a part 510a between each two adjacent second salient poles 511 corresponds to the part 2510a, which has been intensively curved while the base member 2510 has been gradually curved. The part 510a has deteriorated magnetic properties.

Figure 16A:
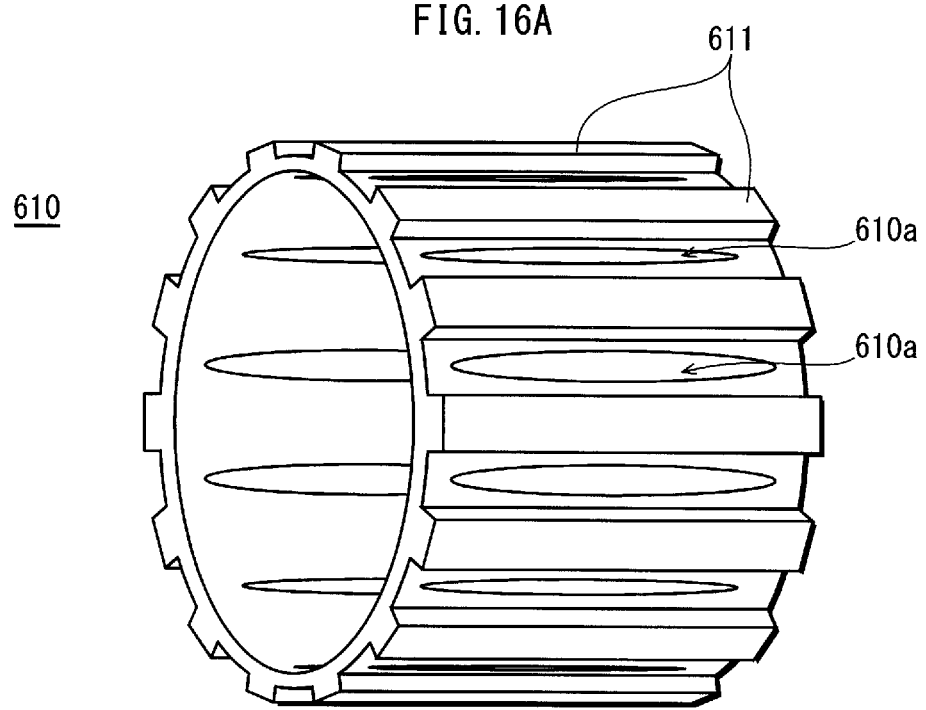
FIG. 16A and FIG. 16B are each a perspective view showing an inner-rotor relating to a modification example.
Figure 16B:
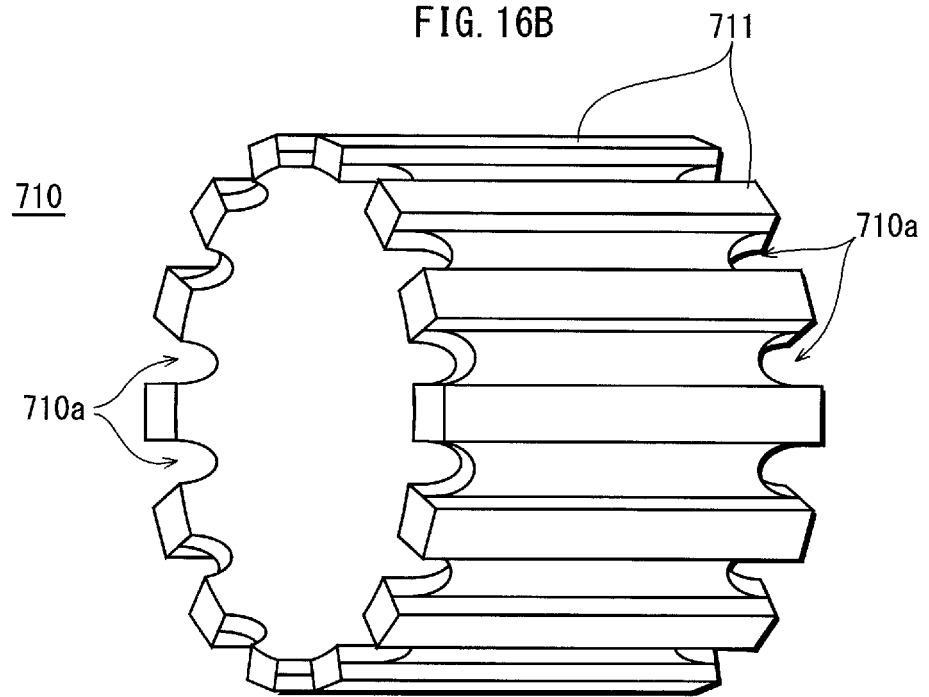

Also, FIG. 16A and FIG. 16B are perspective views showing inner-rotors 610 and 710 relating to another modification examples, respectively.

As shown in FIG. 16A, an inner-rotor 610 is substantially cylindrical, and a part between each two second salient poles 611 has a long hole 610a extending in the central axial direction.

Also, as shown in FIG. 16B, an inner-rotor 710 is substantially cylindrical, and a part between each two second salient poles 711 has a cut part 710a at each end thereof in the central axial direction.

According to the respective structures of the inner-rotors 610 and 710, each two adjacent second salient poles 611 and each two adjacent second salient poles 711 each have a part whose cross-sectional area decreases in the direction perpendicular to the respective circumferential directions of the inner-rotors 610 and 710. As a result, the respective motors including the inner-rotors 610 and 710 reduce magnetic fluxes shorted between each two adjacent second salient poles 611 and each two adjacent second salient poles 711, respectively.

(14) The shape of the outer-rotor 30 relating to the above Embodiment 2 is not limited to the shape shown in FIG. 8.

Figure 17A:
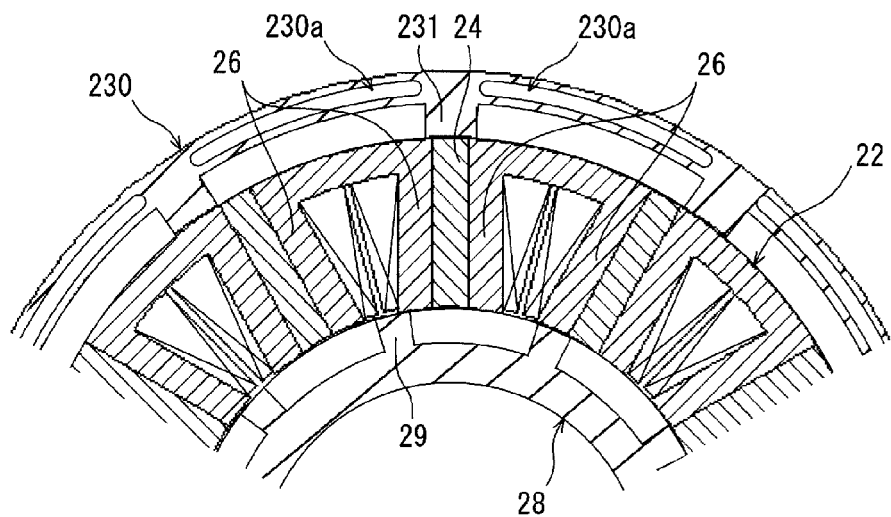
FIG. 17A and FIG. 17B are each a schematic cross-sectional view showing a motor relating to a modification example.
Figure 17B:
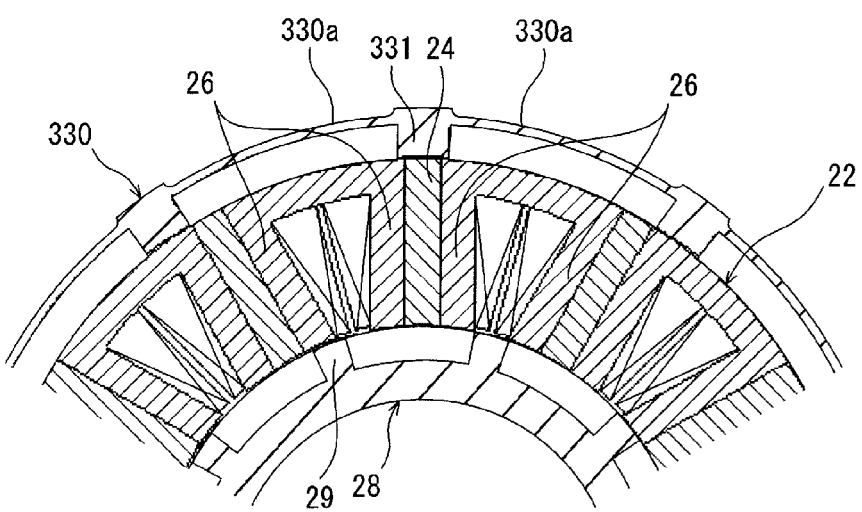

FIG. 17A and FIG. 17B are each a partial cross-sectional view showing a motor relating to the present modification example. In FIG. 17A and FIG. 17B, the components that are the same as those of the motor relating to Embodiment 2 have the same numerical references, and description thereof is appropriately omitted.

As shown in FIG. 17A, each two adjacent first salient poles 231 of an outer-rotor 230 may have a through-hole 230a therebetween so as to penetrate through in the central axial direction of the outer-rotor 230. Note that the shape of the through-hole 230a is not limited to the elongated shape such as shown in FIG. 17A.

Alternatively, as shown in FIG. 17B, a part between each two adjacent first salient poles 331 has a groove 330a on a circumferential surface thereof on the side that is opposite to the projection side of the first salient poles 331.

According to the respective structures of the outer-rotors 230 and 330, each two adjacent second salient poles 231 and each two adjacent second salient poles 331 each have a part whose cross-sectional area decreases in the direction perpendicular to the respective circumferential directions of the outer-rotors 230 and 330. This reduces magnetic fluxes shorted between each two adjacent first salient poles 231 and each two adjacent first salient poles 331, thereby reducing magnetic fluxes flowing from the extending parts 26 to the outer-rotors 230 and 330. This increases magnetic fluxes flowing from the extending parts 26 toward the second salient poles 29 of the inner-rotor 28, in proportion to the reduction in magnetic fluxes flowing from the extending parts 26 to the outer-rotors 230 and 330. As a result, the increase in magnetic fluxes flowing to the inner-rotor 28, which contributes to torque production, leads to achievement of high torque.

<Supplementary Explanation>

(1) The respective motors described in the above Embodiments 1 and 2 and modification examples are also applicable to directly driven linear motors and linear generators.

(2) The respective motors described in the above Embodiments 1 and 2 and modification examples provide a motor that is low-vibration and low-noise, and accordingly are in particular useful for automobiles, for which low-vibration and low-noise motors are in demand.

(3) Furthermore, the respective motors described in the above Embodiments 1 and 2 and modification examples exhibit the cost reduction effect, especially in the case where a comparative large motor with an output of 1 kW or higher that does not adopt rare earth magnets as permanent magnets.

INDUSTRIAL APPLICABILITY

The present invention is utilizable as a motor in compressors, electric cars, hybrid cars, fuel cell-powered cars, and the like.

REFERENCE SIGNS LIST 1 and 21 motor
2 and 22 stator
3 and 23 stator core
4 and 24 permanent magnet
5 and 25 coil
6 and 26 extending part
7 and 27 connecting part
8 and 30 outer-rotor
9 and 31 first salient pole
10 and 28 inner-rotor
11 and 29 second salient pole

The invention claimed is:

1. A motor comprising:
an annular stator that includes a plurality of permanent magnets, a plurality of stator cores, and a plurality of coils, the permanent magnets and the stator cores being alternately arranged in a circumferential direction of the stator,
an annular outer-rotor that is arranged outside the stator, has a rotational axis coincident with a central axis of the stator, and has a plurality of first salient poles; and
an annular inner-rotor that is arranged inside the stator, has a rotational axis coincident with the central axis of the stator so as to rotate in conjunction with the outer-rotor, and has a plurality of second salient poles that are equal in number to the first salient poles, wherein
the permanent magnets are magnetized in the circumferential direction and extend in a radial direction of the stator, and each of the permanent magnets has one end that is opened toward the outer-rotor in the radial direction and the other end that is opened toward inner-rotor in the radial direction,
the coils are each wound by concentrated-winding on a tooth that is constituted from a different one of the permanent magnets and respective parts of two stator cores adjacent to the permanent magnet,
the first salient poles are arranged at offset positions relative to the second salient poles in the circumferential direction,
the stator cores each have two extending parts and a connecting part, the two extending parts each extending from the inner-rotor toward the outer-rotor in the radial direction and each being the part on which the coil is wound, the connecting part connecting the two extending parts with each other on sides thereof facing the inner-rotor in the radial direction,
in a cross section of the motor perpendicular to a direction of the central axis, the extending parts and the permanent magnets each have a first circumferential surface on a side facing the outer-rotor and a second circumferential surface on the side facing the inner-rotor in the radial direction, and
the first salient poles and the second salient poles are arranged such that, in the cross section,
when an edge forward in a first circumferential direction of a circumferential surface of at least one second salient pole is coincident with an edge forward in a second circumferential direction of a second circumferential surface of an extending part that is adjacent, forward in the first circumferential direction, to a permanent magnet corresponding in position with the second salient pole,
at least one first salient pole corresponds in position in the radial direction with a certain portion of the extending part that is adjacent, forward in the first circumferential direction, to the permanent magnet,
where the first circumferential direction and the second circumferential direction are circumferential directions of the stator opposite to each other.

2. The motor of claim 1, wherein
the first salient poles and the second salient poles are arranged such that, in the cross section,
when an edge forward in the second circumferential direction of the circumferential surface of the at least one second salient pole is coincident with an edge forward in the first circumferential direction of a second circumferential surface of an extending part that is adjacent, forward in the second circumferential direction, to the permanent magnet corresponding in position with the second salient pole,
the at least one first salient pole does not correspond in position in the radial direction with the extending part that is adjacent, forward in the second circumferential direction, to the permanent magnet.

3. The motor of claim 1, wherein
the inner-rotor has the second salient poles each made of a magnetic material and other part made of a non-magnetic material.

4. The motor of claim 1, wherein
the first circumferential surface of each of the permanent magnets is recessed in the radial direction against at least respective first circumferential surfaces of two extending parts adjacent to the permanent magnet.

5. The motor of claim 1, wherein
the second circumferential surface of each of the permanent magnets is smaller in width in the circumferential direction than the circumferential surface of each of the second salient poles.

6. The motor of claim 1, wherein
the first salient poles and the second salient poles are arranged such that, in the cross section, a center of each of the second salient poles is positioned on an axis of symmetry of two line segments connecting the central axis with respective centers of any two adjacent of the first salient poles.

7. The motor of claim 1, wherein
the coils are all wound in a same direction, and
each two adjacent of the permanent magnets have respective magnetization directions that are opposite to each other.

8. The motor of claim 1, wherein
the permanent magnets each have an energy product of 150 kJ/m$^3$ or less.

9. The motor of claim 1, wherein
the permanent magnets are each a ferrite magnet.

10. The motor of claim 1, wherein
the number of the first salient poles and the number of the second salient poles are each 14n, the number of the teeth and the number of the coils are each 12n, where n is an integer equal to or greater than one.

11. The motor of claim 1, wherein
the number of the first salient poles and the number of the second salient poles are each 10n, the number of the teeth and the number of the coils are each 12n, where n is an integer equal to or greater than one.

12. A motor comprising:
an annular stator that includes a plurality of permanent magnets, a plurality of stator cores, and a plurality of coils, the permanent magnets and the stator cores being alternately arranged in a circumferential direction of the stator,
an annular outer-rotor that is arranged outside the stator, has a rotational axis coincident with a central axis of the stator, and has a plurality of first salient poles; and
an annular inner-rotor that is arranged inside the stator, has a rotational axis coincident with the central axis of the stator so as to rotate in conjunction with the outer-rotor, and has a plurality of second salient poles that are equal in number to the first salient poles, wherein
the permanent magnets are magnetized in the circumferential direction and extend in a radial direction of the stator, and each of the permanent magnets has one end that is opened toward the outer-rotor in the radial direction and the other end that is opened toward inner-rotor in the radial direction,
the coils are each wound by concentrated-winding on a tooth that is constituted from a different one of the permanent magnets and respective parts of two stator cores adjacent to the permanent magnet,
the first salient poles are arranged at offset positions relative to the second salient poles in the circumferential direction,
the stator cores each have two extending parts and a connecting part, the two extending parts each extending from the inner-rotor toward the outer-rotor in the radial direction and each being the part on which the coil is wound, the connecting part connecting the two extending parts with each other on sides thereof facing the outer-rotor in the radial direction,
in a cross section of the motor perpendicular to a direction of the central axis, the extending parts and the permanent magnets each have a first circumferential surface on a side facing the outer-rotor and a second circumferential surface on the side facing the inner-rotor in the radial direction, and
the first salient poles and the second salient poles are arranged such that, in the cross section,
when an edge forward in a first circumferential direction of a circumferential surface of at least one first salient pole is coincident with an edge forward in a second circumferential direction of a first circumferential surface of an extending part that is adjacent, forward in the first circumferential direction, to a permanent magnet corresponding in position with the first salient pole,
at least one second salient pole corresponds in position in the radial direction with a certain portion of the extending part that is adjacent, forward in the first circumferential direction, to the permanent magnet,
where the first circumferential direction and the second circumferential direction are circumferential directions of the stator opposite to each other.

13. The motor of claim 12, wherein
the first salient poles and the second salient poles are arranged such that, in the cross section,
when an edge forward in the second circumferential direction of the circumferential surface of the at least one first salient pole is coincident with an edge forward in the first circumferential direction of a first circumferential surface of an extending part that is adjacent, forward in the second circumferential direction, to the permanent magnet corresponding in position with the first salient pole,
the at least one second salient pole does not correspond in position in the radial direction with the extending part that is adjacent, forward in the second circumferential direction, to the permanent magnet.

14. The motor of claim 12, wherein
the outer-rotor has the first salient poles each made of a magnetic material and other part made of a non-magnetic material.

15. The motor of claim 12, wherein
the second circumferential surface of each of the permanent magnets is recessed in the radial direction against at least respective second circumferential surfaces of two extending parts adjacent to the permanent magnet.

16. The motor of claim 12, wherein
the first circumferential surface of each of the permanent magnets is smaller in width in the circumferential direction than the circumferential surface of each of the first salient poles.

17. The motor of claim 12, wherein
the first salient poles and the second salient poles are arranged such that, in the cross section, a center of each of the second salient poles is positioned on an axis of symmetry of two line segments connecting the central axis with respective centers of any two adjacent of the first salient poles.

18. The motor of claim 12, wherein
the coils are all wound in a same direction, and
each two adjacent of the permanent magnets have respective magnetization directions that are opposite to each other.

19. The motor of claim 12, wherein
the permanent magnets each have an energy product of 150 kJ/m$^3$ or less.

20. The motor of claim 12, wherein
the permanent magnets are each a ferrite magnet.

21. The motor of claim 12, wherein
the number of the first salient poles and the number of the second salient poles are each 14n, the number of the teeth and the number of the coils are each 12n, where n is an integer equal to or greater than one.

22. The motor of claim 12, wherein
the number of the first salient poles and the number of the second salient poles are each 10n, the number of the teeth and the number of the coils are each 12n, where n is an integer equal to or greater than one.

* * * * *